(12) United States Patent
Wiersma et al.

(10) Patent No.: US 11,838,691 B2
(45) Date of Patent: Dec. 5, 2023

(54) LASER ILLUMINATION SYSTEM WITH REDUCED SPECKLE VIA PHASE SHIFT

(71) Applicant: Snap Inc., Santa Monica, CA (US)

(72) Inventors: Joshua T. Wiersma, Phoenix, AZ (US); Michael Dubinovsky, Mesa, AZ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/494,086

(22) PCT Filed: Mar. 13, 2018

(86) PCT No.: PCT/US2018/022211
§ 371 (c)(1),
(2) Date: Sep. 13, 2019

(87) PCT Pub. No.: WO2018/169974
PCT Pub. Date: Sep. 20, 2018

(65) Prior Publication Data
US 2020/0150450 A1    May 14, 2020

Related U.S. Application Data

(60) Provisional application No. 62/471,323, filed on Mar. 14, 2017.

(51) Int. Cl.
*H04N 9/31* (2006.01)
*G02B 27/09* (2006.01)
(Continued)

(52) U.S. Cl.
CPC ....... *H04N 9/3126* (2013.01); *G02B 27/0927* (2013.01); *G02B 27/286* (2013.01); *G02B 27/48* (2013.01); *H04N 9/3161* (2013.01)

(58) Field of Classification Search
CPC .. G02B 27/0927; G02B 27/286; G02B 27/48; H04N 9/3126; H04N 9/3161; H04N 9/3164
See application file for complete search history.

(56) References Cited

U.S. PATENT DOCUMENTS

| 6,122,023 A | 9/2000 | Chen et al. |
| 6,169,634 B1 | 1/2001 | Sirat |
(Continued)

FOREIGN PATENT DOCUMENTS

| CN | 101276198 A | 10/2008 |
| CN | 102879988 A | 1/2013 |
(Continued)

OTHER PUBLICATIONS

International Search Report and Written Opinion from related case PCT/US2018/022211 dated Aug. 20, 2018.
(Continued)

*Primary Examiner* — Bao-Luan Q Le
(74) *Attorney, Agent, or Firm* — Schwegman Lundberg & Woessner, P.A.

(57) ABSTRACT

An illumination system is disclosed, and such system may include a first light modulator (14) that modulates the phase of beamlets of light and generates phase modulated Gaussian beamlets of light (ABC), a light distributor (18) that transforms, the Gaussian beamlets of light to a homogenized rectangular pattern of light, and a second light modulator (56) that utilizes the phase modulated light to form an image.

20 Claims, 17 Drawing Sheets

(51) Int. Cl.
*G02B 27/28* (2006.01)
*G02B 27/48* (2006.01)

(56) References Cited

U.S. PATENT DOCUMENTS

| | | | |
|---|---|---|---|
| 6,323,984 B1 | 11/2001 | Trisnadi | |
| 6,557,429 B1 | 6/2003 | Kurtz et al. | |
| 6,747,781 B2 | 6/2004 | Trisnadi | |
| 6,769,777 B1* | 8/2004 | Dubin | F21V 11/186 |
| | | | 353/97 |
| 6,791,739 B2 | 9/2004 | Ramanujan et al. | |
| 7,257,384 B2 | 8/2007 | Bar-David et al. | |
| 7,271,962 B2* | 9/2007 | Kasazumi | G02B 5/0221 |
| | | | 348/E9.026 |
| 7,438,423 B2* | 10/2008 | Conner | H04N 9/3105 |
| | | | 353/38 |
| 7,715,084 B2 | 5/2010 | Tan et al. | |
| 7,841,726 B2* | 11/2010 | Conner | G03B 21/2053 |
| | | | 353/94 |
| 8,132,917 B2* | 3/2012 | Osawa | G03B 21/2073 |
| | | | 353/20 |
| 8,224,133 B2* | 7/2012 | Popovich | G02B 27/425 |
| | | | 385/10 |
| 8,565,560 B2* | 10/2013 | Popovich | G02B 5/1828 |
| | | | 385/10 |
| 8,899,754 B2* | 12/2014 | Imai | G03B 21/005 |
| | | | 353/20 |
| 8,902,506 B2 | 12/2014 | Mizuyama et al. | |
| 8,905,548 B2 | 12/2014 | Fan | |
| 9,063,357 B2 | 6/2015 | Li et al. | |
| 9,335,558 B2* | 5/2016 | Yasui | G03B 21/2033 |
| 9,465,227 B2* | 10/2016 | Popovich | G02B 27/425 |
| 9,746,688 B2* | 8/2017 | Popovich | G03H 1/32 |
| 9,857,605 B2* | 1/2018 | Popovich | G02F 1/133606 |
| 10,003,776 B2* | 6/2018 | Damberg | G02B 27/0012 |
| 2004/0017547 A1 | 1/2004 | Kamm et al. | |
| 2006/0227293 A1* | 10/2006 | Kasazumi | G02B 27/48 |
| | | | 353/30 |
| 2007/0046898 A1* | 3/2007 | Conner | H04N 9/3105 |
| | | | 353/31 |
| 2007/0247687 A1 | 10/2007 | Handschy et al. | |
| 2008/0055550 A1* | 3/2008 | Kim | G03B 21/28 |
| | | | 353/20 |
| 2008/0158513 A1 | 7/2008 | Bartlett et al. | |
| 2008/0204847 A1 | 8/2008 | Kamm et al. | |
| 2008/0316439 A1* | 12/2008 | Conner | G03B 21/2013 |
| | | | 353/97 |
| 2009/0161072 A1* | 6/2009 | Yamauchi | G02B 27/281 |
| | | | 353/20 |
| 2009/0207380 A1* | 8/2009 | Aruga | G03B 21/208 |
| | | | 353/20 |
| 2009/0257028 A1* | 10/2009 | Osawa | G03B 21/2033 |
| | | | 353/20 |
| 2010/0202725 A1* | 8/2010 | Popovich | G02B 5/1828 |
| | | | 385/10 |
| 2010/0220297 A1* | 9/2010 | Conner | G03B 21/2053 |
| | | | 353/30 |
| 2010/0232005 A1 | 9/2010 | Lescure et al. | |
| 2012/0019783 A1* | 1/2012 | Imai | G02B 27/283 |
| | | | 353/20 |
| 2012/0081679 A1* | 4/2012 | Matsumoto | G03B 21/204 |
| | | | 353/98 |
| 2012/0281943 A1* | 11/2012 | Popovich | G02F 1/13731 |
| | | | 385/10 |
| 2013/0016136 A1* | 1/2013 | Yasui | G03B 33/08 |
| | | | 345/690 |
| 2013/0107226 A1* | 5/2013 | Aksenov | G03B 21/2033 |
| | | | 353/31 |
| 2014/0037242 A1* | 2/2014 | Popovich | G02F 1/133553 |
| | | | 385/10 |
| 2014/0240378 A1* | 8/2014 | Fujioka | H04N 9/3182 |
| | | | 345/690 |
| 2016/0124241 A1* | 5/2016 | Popovich | G02B 27/48 |
| | | | 349/5 |
| 2016/0377879 A1* | 12/2016 | Popovich | G02F 1/0136 |
| | | | 362/19 |
| 2017/0085846 A1* | 3/2017 | Damberg | H04N 9/3155 |
| 2017/0192246 A9* | 7/2017 | Popovich | G02F 1/13342 |

FOREIGN PATENT DOCUMENTS

| | | |
|---|---|---|
| CN | 106033148 A | 10/2016 |
| CN | 110933951 A | 3/2020 |
| CN | 110933951 B | 3/2023 |
| EP | 3596531 A1 | 1/2020 |
| JP | 2003279889 A | 10/2003 |
| JP | 2008257238 A | 10/2008 |
| JP | 2010091898 A | 4/2010 |
| JP | 7101697 B2 | 7/2022 |
| KR | 20190125460 A | 11/2019 |
| WO | WO-2008047800 A1 | 4/2008 |
| WO | WO-2018169974 A1 | 9/2018 |

OTHER PUBLICATIONS

Voelkel, et al., "Laser Beam Homogenizing: Limitations and Constraints", SPIE Europe, Optical Systems Design, Sep. 2-5, 2008, Glasglow, Scotland, United Kingdom.

J. W. Goodman, "Speckle Phenomena in Optics: Theory and Applications", Roberts & Company, 2007, p. 216-217.

The Linos Laseroptics and Lenses, QIOptiq Photonics for Innovation, www.qioptiq-shop.com/en/Precision-Optics/LINOS-Laseroptics-Lenses.

Strategies for Beam Homogenizing, SUSS MicroOptics, Technical Information Sheet 10—Beam Homogenizer, Jan. 2006.

"Chinese Application Serial No. 201880018417.7, Office Action dated Jan. 29, 2022", w/ English translation, 22 pgs.

"International Application Serial No. PCT/US2018/022211, International Preliminary Report on Patentability dated Sep. 26, 2019", 11 pgs.

"International Application Serial No. PCT/US2018/022211, Invitation to Pay Additional Fees dated Jun. 20, 2018", 9 pgs.

"Japanese Application Serial No. 2019-551323, Final Notification of Reasons for Refusal dated Nov. 9, 2021", w/ English translation, 9 pgs.

"Chinese Application Serial No. 201880018417.7, Decision of Rejection dated Jul. 5, 2022", W/English Translation, 18 pgs.

"Chinese Application Serial No. 201880018417.7, Office Action dated May 17, 2021", w/ English translation, 15 pgs.

"Chinese Application Serial No. 201880018417.7, Response filed Jun. 10, 2022 to Office Action dated Jan. 29, 2022", w/ English claims, 18 pgs.

"European Application Serial No. 18716032.0, Communication under Rule 164(2)(a) EPC dated May 30, 2022", 6 pgs.

"European Application Serial No. 18716032.0, Notification Regarding Rule 164 and Article 94(3) EPC dated Jul. 14, 2022", 12 pgs.

"European Application Serial No. 18716032.0, Response to Communication pursuant to Rules 161(1) and 162 EPC filed May 4, 2020", 20 pgs.

"Malaysian Application Serial No. PI2019005212, Substantive Examination Adverse Report dated Oct. 7, 2022", 2 pgs.

"Chinese Application Serial No. 201880018417.7, Response filed Oct. 20, 2022 to Decision of Rejection dated Jul. 5, 2022", w/ English Claims, 17 pgs.

"Korean Application Serial No. 10-2019-7029968, Notice of Preliminary Rejection dated Mar. 28, 2023", w/ English Translation, 9 pgs.

\* cited by examiner

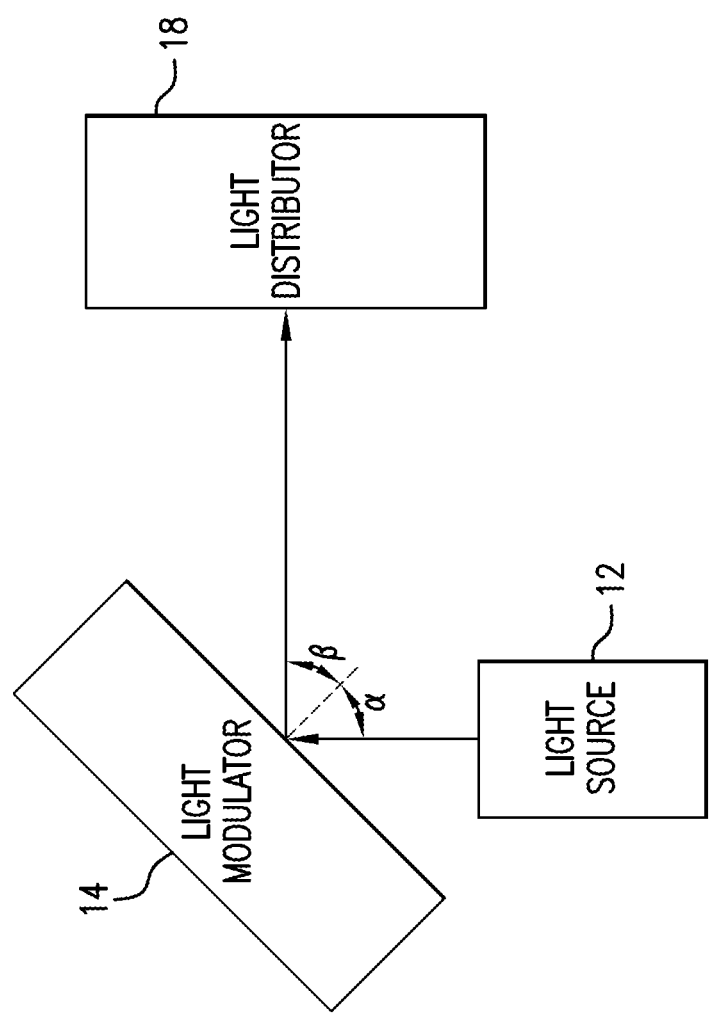

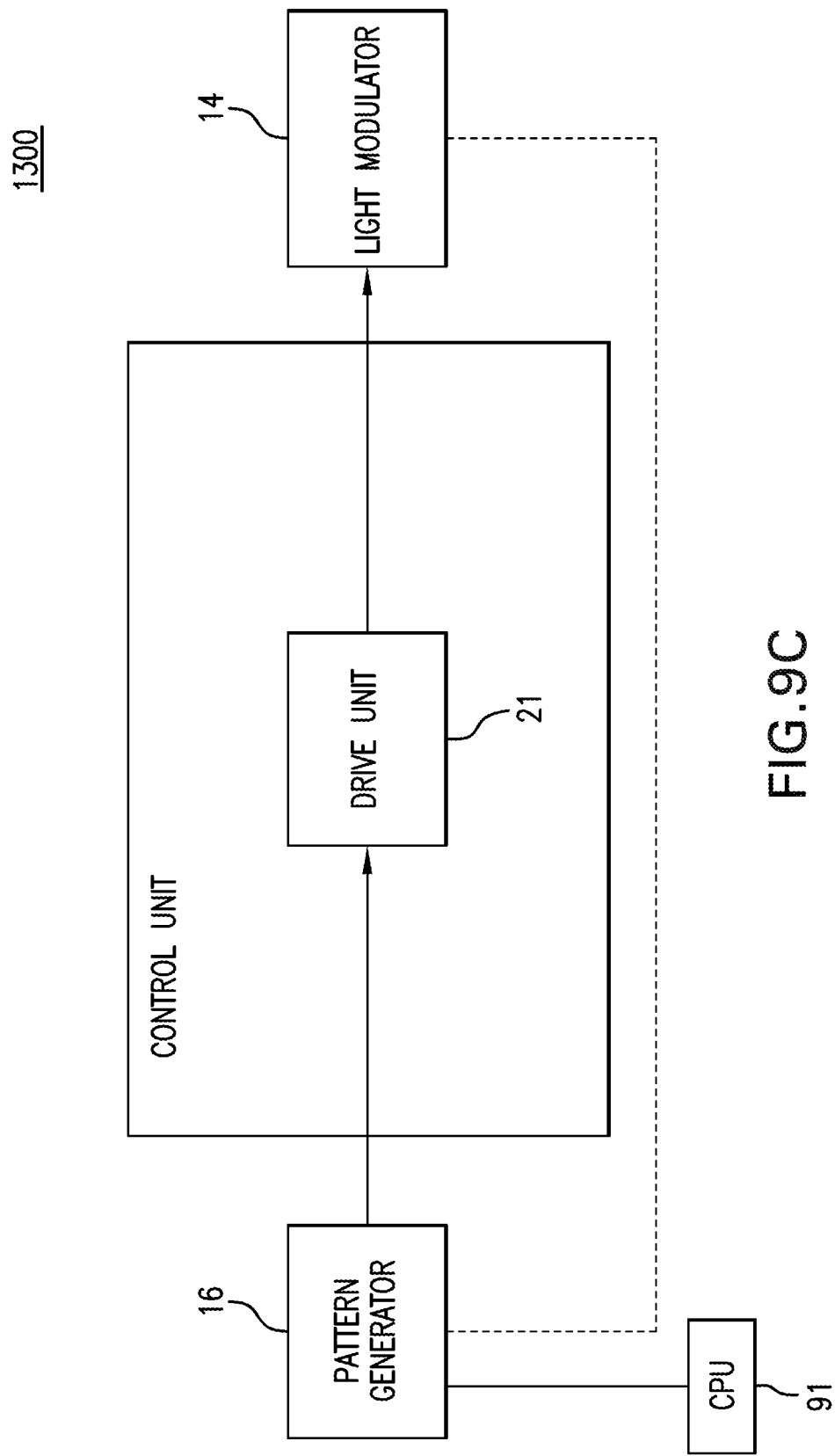

LASER ILLUMINATION SYSTEM WITH REDUCED SPECKLE VIA PHASE SHIFT

CROSS-REFERENCE TO RELATED APPLICATIONS

This application claims priority to U.S. Provisional Application No. 62/471,323, filed Mar. 14, 2017, the entire disclosure of which is incorporated herein by reference.

FIELD OF THE INVENTION

The present invention is directed to illumination systems and methods. More particularly, the present invention relates to laser-related systems having reduced speckle.

BACKGROUND OF THE INVENTION

Lasers offer many advantages when used in display applications such as unique wavelengths (e.g., wide color gamut) and a small etendue (e.g., high brightness). However, certain properties of lasers are known to create image artifacts, for example speckle, as a result of a laser's highly coherent nature.

Some laser despeckling methods merely include moving diffusers, deforming mirrors, and vibrating fly-eye arrays that temporally average speckle patterns using random macroscopic movements. However, these types of despeckling methods include some sort of mechanical operation. Often, because of the mechanical operations, these type of devices may prove problematic in practice due to ancillary vibrations, noise, lifetime reduction, and environmental vulnerability. For example, in the context of laser projection systems, the undesired vibrations, from a mechanical despeckler, may degrade image quality by shaking the display device and the associated projection optics. Also, the wear associated with moving parts may reduce the lifetime of the product. Additionally, moving parts may be lightweight in nature, and thus, the lightweight nature of fast moving components may make the display device vulnerable to environmental disturbances such as incidental drops of the display device.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings:

FIG. 3C illustrates a block diagram of an illumination system in accordance with the present invention.

FIGS. 9A-9C illustrate control systems in accordance with the present invention.

DETAILED DESCRIPTION OF THE ILLUSTRATED EMBODIMENTS

Figure 1A:
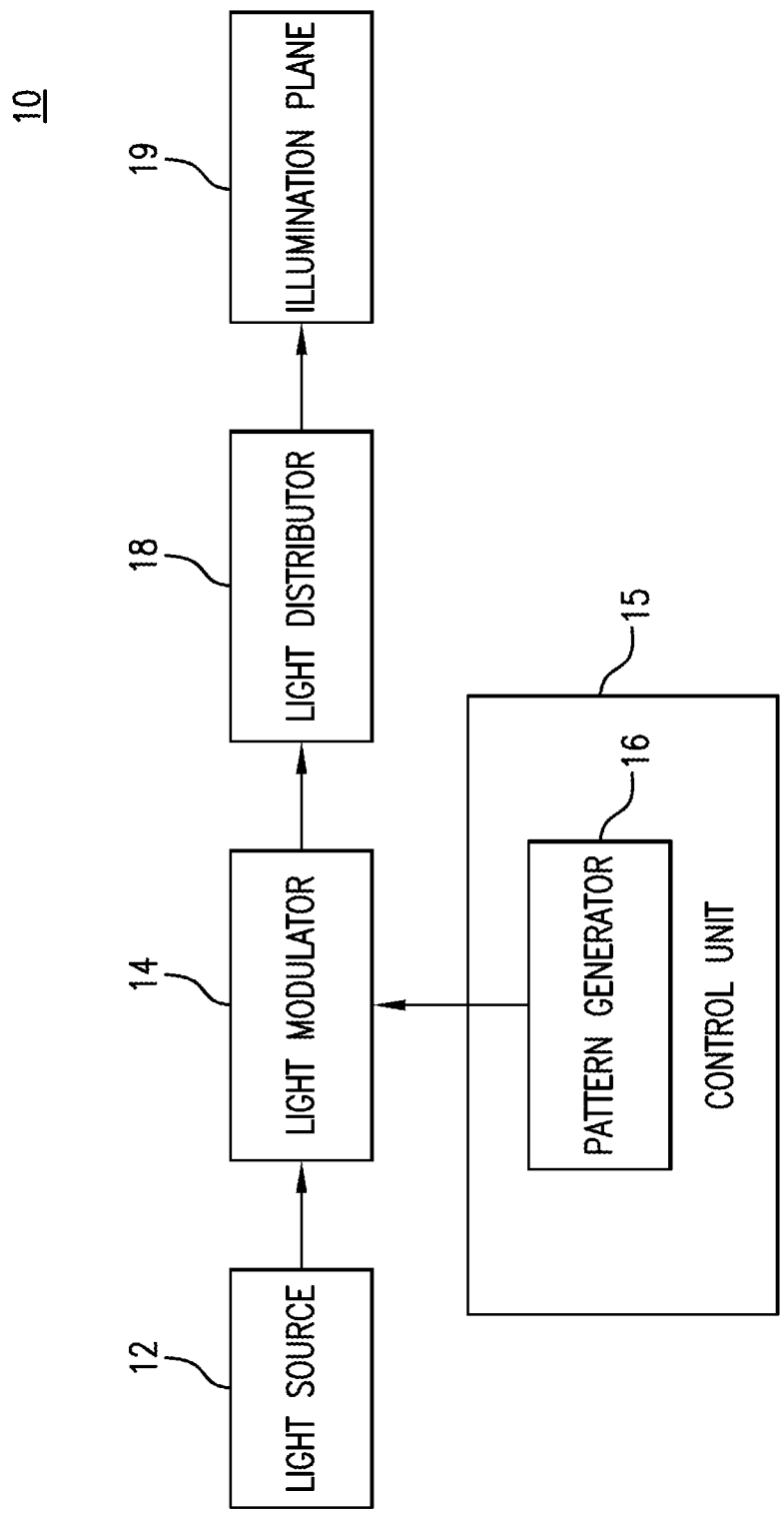
FIG. 1A illustrates a block diagram of an illumination system in accordance with the present invention.

In the following detailed description, reference is made to the accompanying drawings which form a part hereof and in which are shown, by way of illustration, embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B," "A or B," or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The descriptions may use the terms "embodiment" or "embodiments," which may each refer to one or more of the same or different embodiments. Furthermore, the terms "comprising," "comprises," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting specific design details described below.

Shown in FIG. 1A, is an electromagnetic radiation system, apparatus, and/or device 10, in accordance with the present invention, for example, an illumination system that may be utilized to, for example, despeckle an image. An illumination system 10, in accordance with the present invention, may include a source of electromagnetic radiation 12, for example a light source such as a laser light source. The source of electromagnetic radiation 12 may be a visible light source, for example, a laser. In an embodiment of the present invention, the laser may be a solid state laser. However, it would be obvious to one of ordinary skill in the art that the type of electromagnetic radiation device 12 may vary.

The system 10 may also include a first electromagnetic radiation modulator 14, for example, a light modulator device that receives radiation (e.g., light) from the light source 12. In an embodiment of the present invention, the electromagnetic radiation modulator 14 (e.g., a light modulator device) may be a phase-only light modulator and/or a non-image forming light modulator (i.e., the light modulator 14 does not directly output an image). In other embodiments, the phase modulating functions of a light modulator 14, having both phase and amplitude modulating and/or image-forming functionality, is utilized. In an embodiment of the present invention, the electromagnetic radiation modulator 14 (e.g., a light modulator device) may modulate multiple characteristics of incoming electromagnetic radiation (such as light), for example, phase, amplitude, polarization and/or some other characteristic of incoming light. In an embodiment of the present invention, the light modulator 14 is, for example, a liquid crystal device, a liquid crystal display, liquid-crystal-on-silicon (LCOS) display, microdisplay, a micro electro-mechanical system (MEMS) display, digital light processing (DLP) display, optically addressed spatial light modulator (OASLM), hologram modulator (e.g., a computer generated hologram (CGH) device) and/or other type of display (e.g., analog, binary, electrically addressed and/or optically addressed display) that receives light from the light source 12, directly or indirectly. The light modulator 14 divides light received, for example, laser light and/or homogenized light beam into beamlets of light. In an embodiment of the present invention, each of the beamlets may, for example, correspond to one or more pixels and/or one or more groupings of pixels.

The system 10 of the present invention may also include a control unit and/or system 15,15' that addresses one or more pixels of the light modulator 14 and/or modulates the phase of the beamlets (e.g., beamlets of light) corresponding to the one or more pixels. The control unit/system 15,15',700 may include and/or be coupled to a pattern generator 16 that determines the phase of the electromagnetic radiation beamlets (e.g., light beamlets) emitted or output from the light modulator 14. In an embodiment of the present invention, the control unit/system 15,15',700 may be coupled to the light modulator 14, for example, electrically via a wireless connection, wireline connection, and/or optical connection (e.g. via a laser beam, infrared light, or fiber optic), and may, for example, control, induce, and/or be determinative of relative phase shifts between all or some of the beamlets of light (e.g., adjacent beamlets of light) generated by pixels (e.g., adjacent pixels) of the light modulator 14.

Figure 1D:
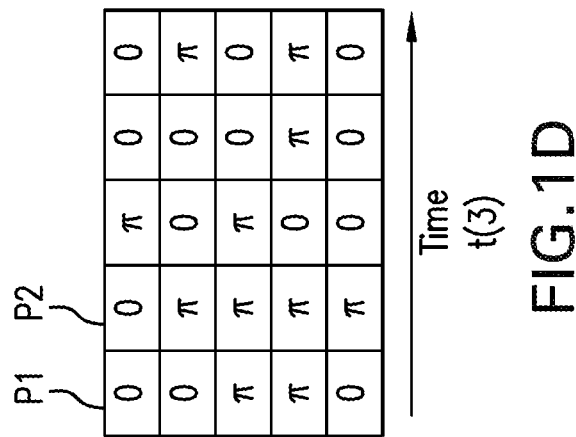
FIGS. 1B, 1C, and 1D illustrate exemplary relative phase shift patterns in accordance with the present invention.
Figure 1C:
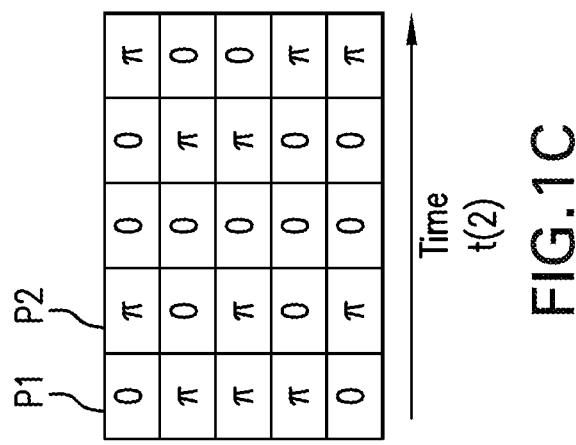
Figure 1B:
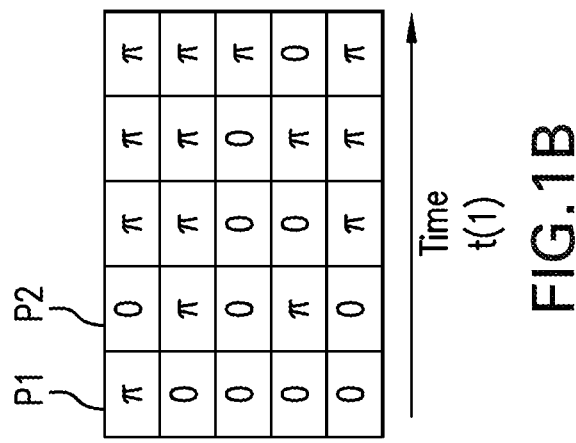

In an embodiment of the present invention, the pattern generator 16 may output, access, store and/or generate one or more phase patterns, for example, one or more predefined relative phase shift patterns, one or more random relative phase shift patterns, and/or one or more pseudo random relative phase shift patterns that are utilized to determine the relative phase shift relationships between adjacent beamlets of light output by the light modulator 14. For example, shown in FIGS. 1B,1C,1D are examples of relative phase shift patterns, which are stored, output, accessed and/or generated by the pattern generator 16, between two or more adjacent pixels, and/or groupings of pixels, at different instances in time. By varying the relative phase shift patterns at different instances in time, speckle appearing in light at one instance in time according to a first relative phase shift pattern, averages to zero or toward zero with respect to the human eye and/or other detector, when integrated with speckle generated in accordance with a second and different relative phase shift pattern at a different instance in time. In embodiments of the present invention, the relative phase shift patterns may be despeckle patterns. In an embodiment of the present invention, for example, the first relative phase shift pattern and the second relative phase shift pattern may not be sequentially generated, and there may be intervening relative phase shift patterns. In an embodiment of the present invention, the first and second relative phase shift patterns are sequential. It would be understood by one of ordinary skill in the art that such exemplary patterns illustrated in FIGS. 1B,1C,1D could be for example, repeated, summed, and/or divided, such that the patterns are generated for all or some of the pixels of the light modulator 14.

FIGS. 1B,1C,1D illustrate the corresponding phases, phase differences, and/or relative phase shifts of an exemplary set of pixels or subset of pixels of the light modulator 14. In an embodiment of the present invention, the control unit and/or system 15,15' controls each of the beamlets of light output by a light modulator 14 (e.g., an analog, binary display or hybrid analog/digital spatial light modulator), such that there is a relative phase shift of zero or pi radians between at least one pair of adjacent beamlets of light (e.g., neighboring beamlets of light) generated by the light modulator 14. In an embodiment of the present invention, the control unit and/or system 15,15' may control each of the beamlets of light output by a light modulator 14 that is solely a digital spatial light modulator. In an embodiment of the present invention, the light modulator 14 may be, for example, a binary display, and the control unit/system 15,15',700 controls each of the beamlets of light output from the light modulator 14, such that there is a relative phase shift of zero (0) or pi radians between at least one pair of adjacent beamlets of light (e.g., neighboring beamlets of light) generated by the light modulator 14. In an embodiment of the present invention, the control unit/system 15,15', 700 controls each of the beamlets of light output from the light modulator 14, such that there is a relative phase shift of some degree of radians, between and including, zero (0)

and two (2) pi radians, between at least one pair of beamlets of light (e.g., neighboring beamlets of light) generated by the light modulator 14. In an embodiment of the present invention, the control unit/system 15,15',700 controls each of the beamlets, such that there is a relative phase shift of a number (x) radians between at least one pair of beamlets of light (e.g., neighboring beamlets of light) generated by the light modulator 14, wherein (x) is between and including zero (0) or two (2) pi radians and/or any fraction or multiple thereof. In an embodiment of the present invention, the control unit/system 15,15',700 controls each of the beamlets of light generated by the light modulator 14, such that there is a relative phase shift of a number (x) radians between at least one pair of beamlets of light (e.g., neighboring beamlets of light) generated by the light modulator 14, wherein (x) is between and including zero (0) or two (2) pi radians and/or any fraction or multiple thereof, and the relative phase shift between at least one pair of the beamlets of light, at an instance in time, may differ from a relative phase shift of one or more other pairs of adjacent beamlets of light generated by the light modulator 14. In an embodiment of the present invention, a relative phase shift between pairs of adjacent beamlets of light generated by the light modulator 14 may be random, and may differ from at least one other pair of adjacent beamlets of light generated by the light modulator 14, and the degree of relative phase shift between any of the pair of adjacent beamlets of light generated by the light modulator 14 may be any degree of radians between and including zero (0) or two (2) pi radians and/or any fraction or multiple thereof. In an embodiment of the present invention, one or more relative phase shifts between adjacent pixels of a light modulator 14 may vary between and including zero (0) or two (2) pi radians and/or any fraction or multiple thereof, and may differ from one or more relative phase shifts between other adjacent pixels of a light modulator 14, at an instance in time. In an embodiment of the present invention, the light modulator 14 may be an analog light modulator.

In an embodiment of the present invention, the control unit/system 15,15',700 may drive the light modulator 14 according to a phase pattern from, for example, a pattern generator 16. The phase pattern may be represented by a matrix of phase values that correspond to pixels of the light modulator 14, wherein each phase value of the phase pattern determines the phase of a light beamlet and/or grouping of light beamlets that are output by the corresponding respective pixel and/or grouping of pixels of the light modulator 14. In an embodiment of the present invention, the control unit/system 15,15',700 drives the phase of the beamlets of light that are output from the light modulator 14 according to the phase pattern that is, for example, stored and/or generated by the pattern generator 16. In an embodiment of the present invention, the pattern generator 16 may store and/or generate random and/or pseudo random phase patterns.

As shown in FIGS. 1B,1C,1D, the relative phase shift created between pairs of pixels by, for example, the control unit 15, varies, is random, and/or is pseudo random at different instances of time, for example, times t(1), t(2), and t(3). For example, as shown in FIG. 1B, at t(1) pixel P1 lags pixel P2 by 180 degrees or pi radians; at t(2) pixel P1 leads pixel P2 by 180 degrees or pi radians; and at t(3) pixel P1 and P2 are in phase. For exemplary purposes, each of the one or more beamlets is described as being randomly initiated to have a phase of zero radians or pi radians (i.e., one hundred eighty degrees). In an embodiment of the present invention, control unit/system 15,15',700 may induce random or pseudo random relative phase shifts or phase differences between pairs of adjacent or neighboring beamlets at different instances in time. In an embodiment of the present invention, control unit/system 15,15',700 may vary the phase pattern such that at an instance in time, there may be no phase difference between at least two adjacent beamlets of light output by the light modulator 14.

In an embodiment of the present invention, the control unit/system 15,15',700 generates or induces an n×n orthogonal matrix pattern, for example, a Hadamard matrix pattern or partial Hadamard matrix pattern to control and/or modulate the phase of pixels of the light modulator 14 at one or more instances in time.

The system 10 of the present invention may also include a light distributor/beam shaping device 18. In an embodiment of the present invention, the light distributor 18 for example, distributes, diffracts, reflects, refracts, scatters, modifies, transforms, and/or homogenizes light, received directly or indirectly, from the light modulator 14. In an embodiment of the present invention, the light distributor 18 is a diffractive element, for example, a diffractive optical element that diffracts light received, directly or indirectly, from the light modulator 14. In an embodiment of the present invention, the light distributor 18 superimposes the beamlets of light generated by the light modulator 14 onto an illumination/image plane 19 (i.e., a plane of an object and/or a plane in space), and for example, homogenizes such light via the process of superimposing the beamlets of light. In an embodiment of the present invention, the light distributor 18 superimposes at least parts of portions of light received onto at least parts of some other portions of light received. For example, the light distributor superimposes at least part of one beamlet of light onto at least part of another at least one beamlet of light.

In an embodiment of the present invention, the light distributor may be a beam shaping device/light distributor 18 that shapes light and/or beamlets of light into a different pattern and/or shape of light. For example, in an embodiment of the present invention, the beamlets of light generated or output by the light modulator 14 are Gaussian or near Gaussian beams of electromagnetic radiation (e.g., light) and the light distributor 18 may be utilized to transform, homogenize and/or modify the Gaussian or near Gaussian beamlets of light, which are received by the light distributor 18, into a pattern or shape of light having a uniform or near uniform intensity, for example, a pattern of light that is or approximately is, for example, round, rectangular, square, line, or some other shape or pattern. In an embodiment of the present invention, the light distributor 18 may transform or homogenize the Gaussian or near Gaussian beamlets of light into a pattern or shape that is, for example, rectangular or approximately rectangular in shape. In an embodiment of the present invention, the light distributor 18 may be a light tunnel, light tube, or light pipe that reflects and/or bounces light using mirrors positioned in a tunnel or hollow like apparatus, of any shape, that is, for example, open at both ends of the tunnel-like structure. In an embodiment of the present invention, the light distributor 18 may be a light tunnel or light pipe that is constructed form a solid material, for example, glass or a transparent solid material that contains light by total internal reflection. In an embodiment of the present invention, the light distributor 18 may be an assembly of two or more mirrors (e.g., for example an assembly of mirrors having a kaleidoscope structure). The mirrors positioned in the tunnel-like structure superimpose, for example, at least parts of portions of light received onto at least parts of some other portions of light received. In an embodiment of the present invention, the light distributor 18 may by a light pipe that superimposes, for example, at least parts of portions of light received onto at least parts of some other portions of light received, as the light inside of the pipe reflects and/or bounces off of the walls of the light pipe. In an embodiment of the present invention, the light distributor 18 may be one or more microlens and/or microlens array that refracts light and for example, during refraction superimposes at least part of one or more beamlets of light over at least portions of another beamlet or beamlets of light.

In an embodiment of the present invention, the light distributor 18 distributes and/or optically couples light from the light distributor 18 to an image plane 19 (i.e., a plane of an object or a plane in space), real or imaginary, which receives the distributed light, for example, the diffracted, refracted, scattered, superimposed, and/or reflected light.

Figure 2:
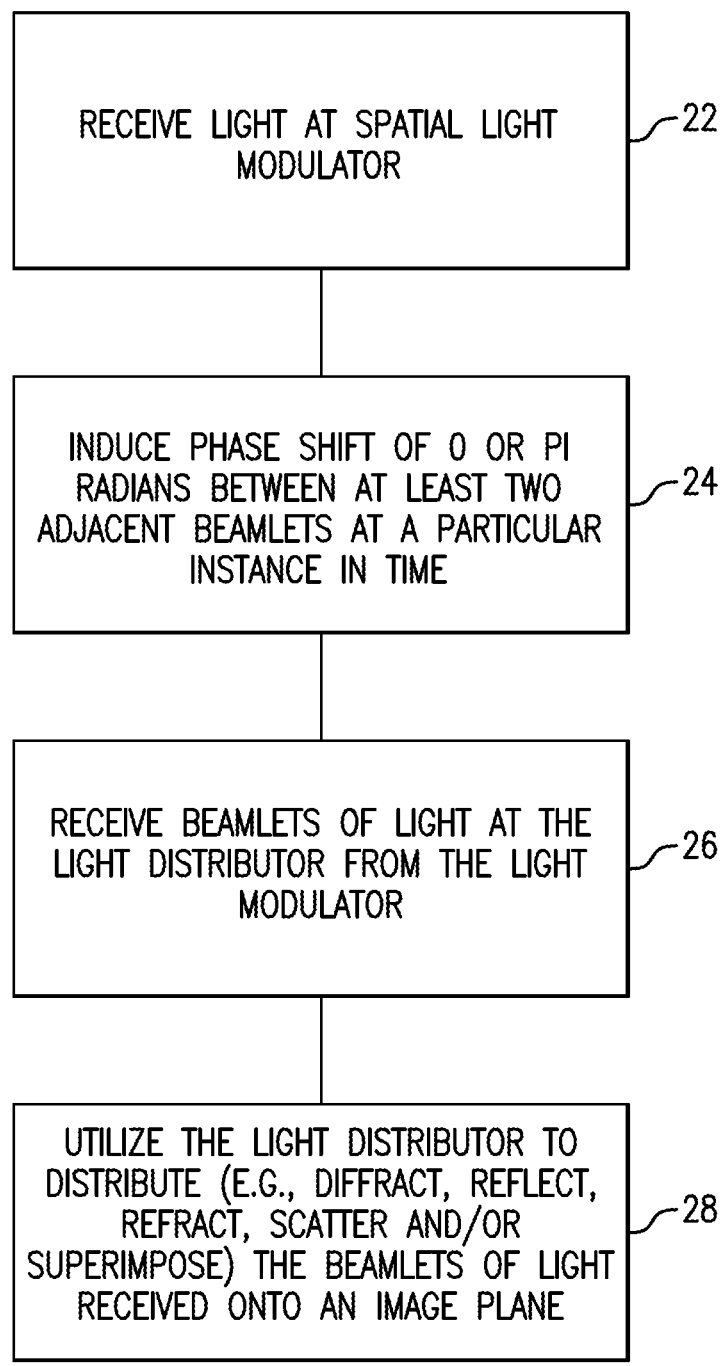
FIG. 2 illustrates a flow chart of a method of illumination in accordance with the present invention.

Shown in FIG. 2 is an illumination method 20 in accordance with the present invention. In step 22, the light modulator 14 receives electromagnetic radiation, for example, light, from a light source 12 (e.g., a laser light source). In step 24, the control unit/system 15,15',700 creates or induces at least one relative phase shift of zero (0) or pi radians, or some number (e.g., some random number) between and including zero (0) and two (2) pi radians, between at least two beamlets of light generated by the light modulator 14 at a particular instance in time. In an embodiment of the present invention, the control unit and/or system 15 induces, via, for example, a pattern generator 16, relative phase shifts of zero (0) or pi radians (and/or some fraction or multiple thereof) between at least two adjacent beamlets of light generated by the light modulator 14 at a particular instance in time. For example, in one instance in time, there is no phase shift of difference between the two beamlets of light (i.e., the control system induces a phase shift of zero (0)) and in another instance in time, there may be for example, a phase shift of pi ($\pi$).

In step 26 of the present invention, a light distributor 18 or other electromagnetic radiation distributor 18, for example, a diffractive optical element (such as a diffractive homogenizer that receives, directly or indirectly, each beamlet of light generated by the light modulator 14, and in step 28 distributes (e.g., diffracts) light from each beamlet of light. The electromagnetic radiation distributor 18 may also be a light tunnel, a light tube, or light pipe that receives, directly or indirectly, each beamlet of light generated by the light modulator 14, and in step 28 distributes (reflects, refracts, and/or scatters) light from each beamlet of light. In an embodiment of the present invention, the light distributor 18 may be a diffractive homogenizer that diffracts light. In an embodiment of the present invention, the light distributor 18 is one or more beam shaping optic devices, for example, one or more diffractive optical elements. In an embodiment of the present invention, in step 28, the light distributor 18 distributes light to, for example, an image plane 19 (i.e., a plane of an object or a plane in space) such that light at each point on the image plane (i.e., a plane of an object or a plane in space) is made up of light contributions from various beams or beamlets of light that have been distributed (e.g., diffracted) by the light distributor 18.

In an embodiment of an illumination method 20 in accordance with the present invention, step 24, involving phase modulation of the beamlets of light generated by the light modulator 14, is performed before the light distribution step 28. In another embodiment of the present invention, phase modulation of the beamlets of light is performed after the light distribution step.

By generating relative phase shifts in a pattern of light and/or beamlets of light, at discrete time intervals, a coherent light source, for example, may be made to resemble having some properties consistent with incoherent light sources, for example, the temporally and/or spatially incoherent property typically associated with incoherent light sources. Consequently, utilizing the control unit/system 15,15',700 to induce relative phase shifts in a pattern of light output by the light distributor 18 and/or the beamlets of light output by the light modulator 14, contributes to speckle reduction in an image resulting from use of an illumination and/or projection method or system in accordance with the present invention. Also, when light is received at an image plane 19 (i.e., real or imaginary plane of an object or a plane in space), via, for example, the light distributor 18, the light at points on the image plane 19 has light contributions from multiple beamlets of light from the light modulator 14, which are in phase or out of phase by, for example, pi radians. Consequently, light at points on the image plane 19 vary or are less coherent (e.g., spatially and/or temporally), for example, by a significant or greater degree due to multiple light contributions of varying phases. Thus, the phase of light at a single point, over a period of successive time intervals, averages to, for example, the human eye and/or other detector such that speckle is reduced in an image that is generated utilizing an illumination and/or projection system and/or method in accordance with the present invention.

Figure 3A:
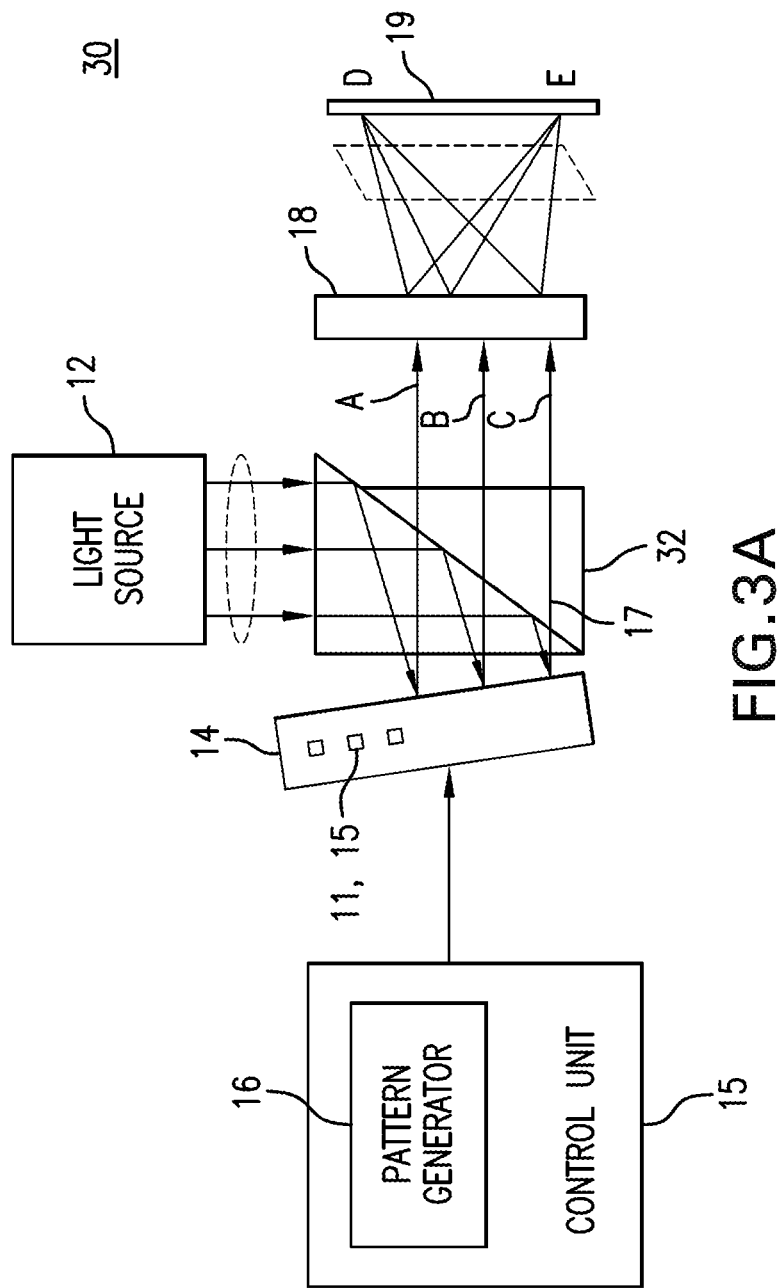
FIG. 3A illustrates an illumination system in accordance with the present invention.

Shown in FIG. 3A is an embodiment of an illumination system 30 in accordance with the present invention. The system 30 may include an electromagnetic radiation source 12, for example, a laser light source. The system 30 may also include a light director device 32, which may include, for example one or more optical and/or other elements, for example, one or more prisms (such as a pair of prisms), one or more Bragg gratings (e.g., hologram Bragg gratings), one or more lenses, one or more hologram optical elements, one or more mirrors, one or more fibers (such as optical fibers), and/or other optical elements). In an embodiment of the present invention, the pair of prisms may or may not have a gap or space between them. The light director 32 may receive electromagnetic radiation (e.g., light), directly or indirectly, from the radiation source 12.

In an embodiment of the present invention the light director 32 may reflect and/or transmit light. In an embodiment of the present invention, the light director 32 may be utilized to reflect and/or optically couple light from the light director 32 onto the light modulator 14. In an embodiment of the present invention, the light director 32 may be a total internal reflection prism (TIR) device that includes a pair of prisms that reflects and/or transmits light according to, for example, the critical angle and/or refractive properties relative to the material or materials of which the light director 32 is constructed.

In an embodiment of the present invention the light director 32 may be utilized to deliver light or optically couple light, which it receives from the light source 12, to the light modulator 14 such that the light from the light director 32 arrives at the light modulator 14 normal to or substantially perpendicular to the light modulator 14. In an embodiment of the present invention the light director 32 may be utilized to deliver light (e.g., beamlets of light 17), which it receives from the light modulator 14, to the light distributor 18 such that the light from the light director 32 arrives at the light distributor 18 normal to or substantially perpendicular to the light distributor 18.

In an embodiment of the present invention, the system 30 may also include a control unit/system 15,15',700 that is utilized to create relative phase shifts of, for example, zero or pi between pairs of beamlets of light output by the light modulator 14 or at least one relative phase shift of pi between at least two of the beamlets of light output by the light modulator 14 at an instant in time. In an embodiment of the present invention, the control unit/system 15,15',700 may induce random relative phase shifts, at an instance in time of, for example, zero or pi radians between beamlets of light generated by the light modulator 14.

The system 30 may include an image plane 19 that receives the light from the light distributor 18. In an embodiment of the present invention, the light distributor 18 receives light from each of the beamlets of light generated by the light modulator 14 (having pixels 11), and distributes (e.g., diffracts and/or spreads) light from each of the beamlets of light to an image plane 19. As shown in FIG. 3A, the light distributor 18 may distribute (e.g., diffracts) light such that, for example, light received at point A on the light distributor 18 is distributed by the light distributor 18 to points D and E on the image plane 19. Similarly, light received at point B on the light distributor 18 is distributed by the light distributor 18 to points D and E on the image plane 19. Likewise, light received at point C on the light distributor 18 is distributed by the light distributor 18 to points D and E on the image plane 19. Consequently, for example, light at each of points D and E on the image plane 19 is made up of contributions of light received and the light distributor 18 at points A, B, and C.

In an embodiment of the present invention, a system in accordance with the present invention may include an image plane 19 that receives light, directly or indirectly, after it has passed through the light distributor 18 (e.g., a diffractive optical element).

Figure 3B:
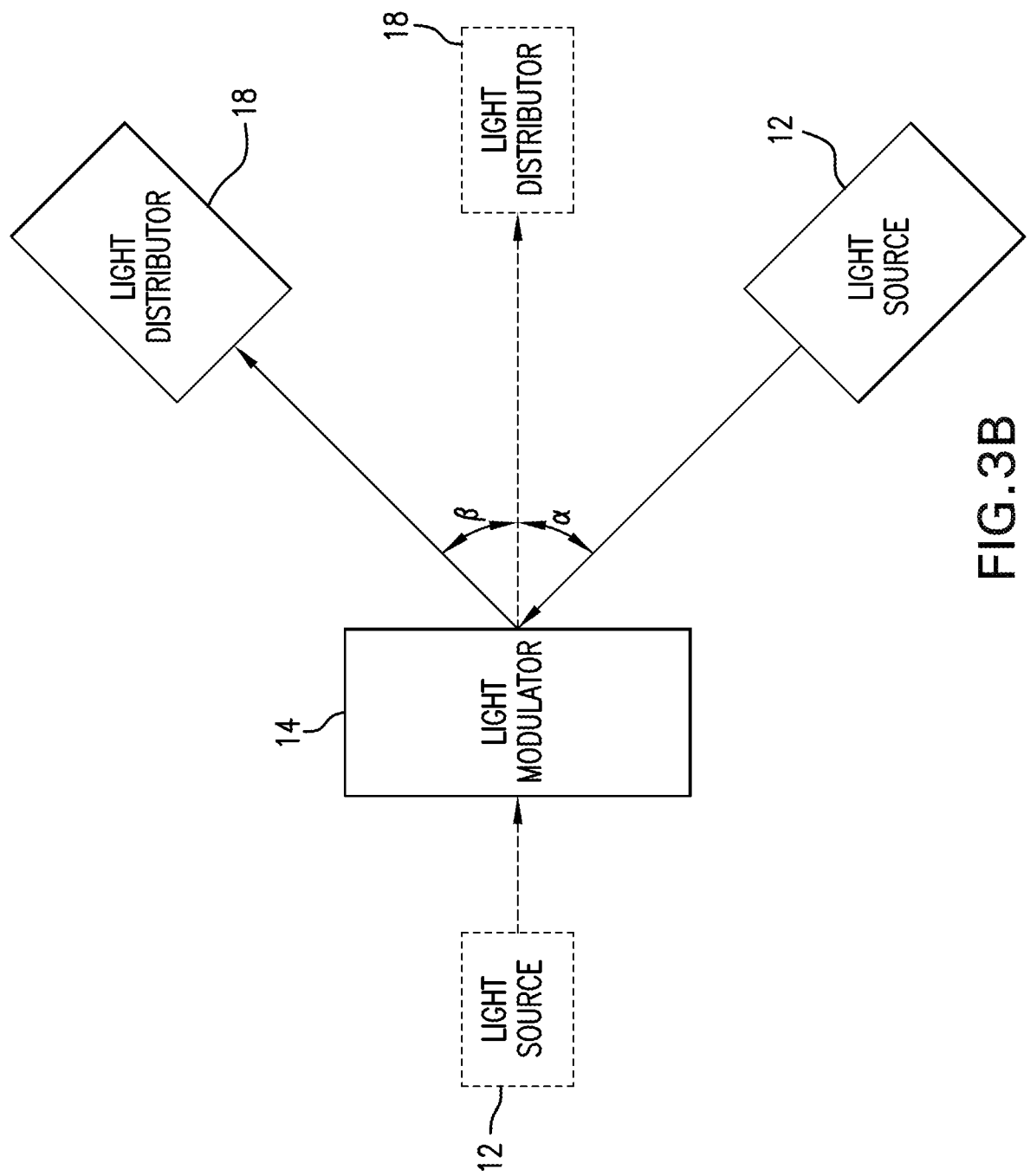
FIG. 3B illustrates a block diagram of an illumination system in accordance with the present invention.

In an embodiment of a system 90, in accordance with the present invention, for example, an illumination system as shown in FIG. 3B, light from a light source 12 may propagate to a light modulator 14, such that light arrives at the light modulator at an angle alpha (α) with the light modulator 14 (i.e., angle of incidence). In an embodiment of the present invention, as shown in FIG. 3B, for example, light from a light source 12 may propagate to the light modulator 14 (e.g., a reflective light modulator), such that light arrives at the light modulator 14 at an angle alpha (α) with the light modulator 14, wherein, for example, zero (0) degrees<α<ninety (90) degrees, and exits the light modulator 14 at an angle beta (β), wherein zero (0) degrees<β<ninety (90) degrees. In an embodiment of the present invention, the angle of incidence alpha (α) is as close as possible to zero (0) degrees given the constraint that the light source may not be obstructed, for example, obstructed by the light distributor 18. In an embodiment of the present invention, as shown in FIG. 3B, for example, light from a light source 12 may propagate to the light modulator 14 (e.g., a transmissive light modulator), such that light arrives at the light modulator 14 at an angle alpha (α) with the light modulator 14, wherein, for example, zero (0) degrees≤α<ninety (90) degrees, and exits the light modulator 14 at an angle beta (β), wherein zero (0) degrees≤β<ninety (90) degrees. In an embodiment of the present invention, light exits normal to or substantially perpendicular to the light modulator 14 and/or light distributor 18 (e.g., a diffractive optical element).

In another embodiment of a system 100, in accordance with the present invention (e.g. an illumination and/or projection system in accordance with the present invention), as shown in FIG. 3C, light from a light source 12, for example, may propagate to a light modulator 14, such that light arrives at the light modulator 14 at an angle alpha (α) (i.e., an angle of incidence) with the light modulator 14, where angle alpha (α) is forty-five degrees or approximately forty-five degrees, and such that light exits the light modulator 14 perpendicular to or substantially perpendicular to, for example, a plane and/or surface (e.g., a surface of light distributor 18). In an embodiment of the present invention the light distributor 18 may be, for example, a diffractive device such as a diffractive homogenizer. In an embodiment of the present invention, the plane and/or surface (e.g., a surface of light distributor 18) is parallel or substantially parallel to a surface of the light source 12. In an embodiment of a system in accordance with the present invention (e.g., an illumination system and/or projection system in accordance with the present invention), the light modulator 14 separates and/or divides incoming light into beamlets of light 17, each of which corresponds to a illumination system cell 15 (e.g., a liquid crystal cell, pixel, and/or grouping of pixels) of the light modulator 14. In an embodiment of the present invention the light modulator 14 may be a phase-only LCOS microdisplay.

Systems, in accordance with the present invention, for example, illumination systems and/or projector systems, may be utilized to reduce speckle contrast. The formula for speckle contrast (C) is described below:

$$C = \sqrt{\frac{M + K - 1}{MK}}$$

(see J. W. Goodman, Speckle Phenomena in Optics: Theory and Applications (Roberts & Company, 2007).

where M equals a number of independent diffuser realizations averaged in time, and K equals the number of viewing optic device (e.g., a lens, a projection lens, eyepiece, eyewear lens, or headgear lens) resolution elements lying under a detector resolution element on the image plane (e.g., a reflective or transmissive screen). With increased diffuser realizations (e.g., with increased generation of relative phase patterns by, for example, control unit/system 15,15',700 and/or pattern generator 16,16' within an integration time), speckle contrast is reduced. Additionally, a system in accordance with the present invention may be utilized to enhance image quality of display-related products, for example, display products that utilize lasers. Additionally, the lifetime of a device that utilizes a system, in accordance with the present invention, may avoid use of a mechanical device for modulating light, and improve the lifetime of the device.

Figure 4:
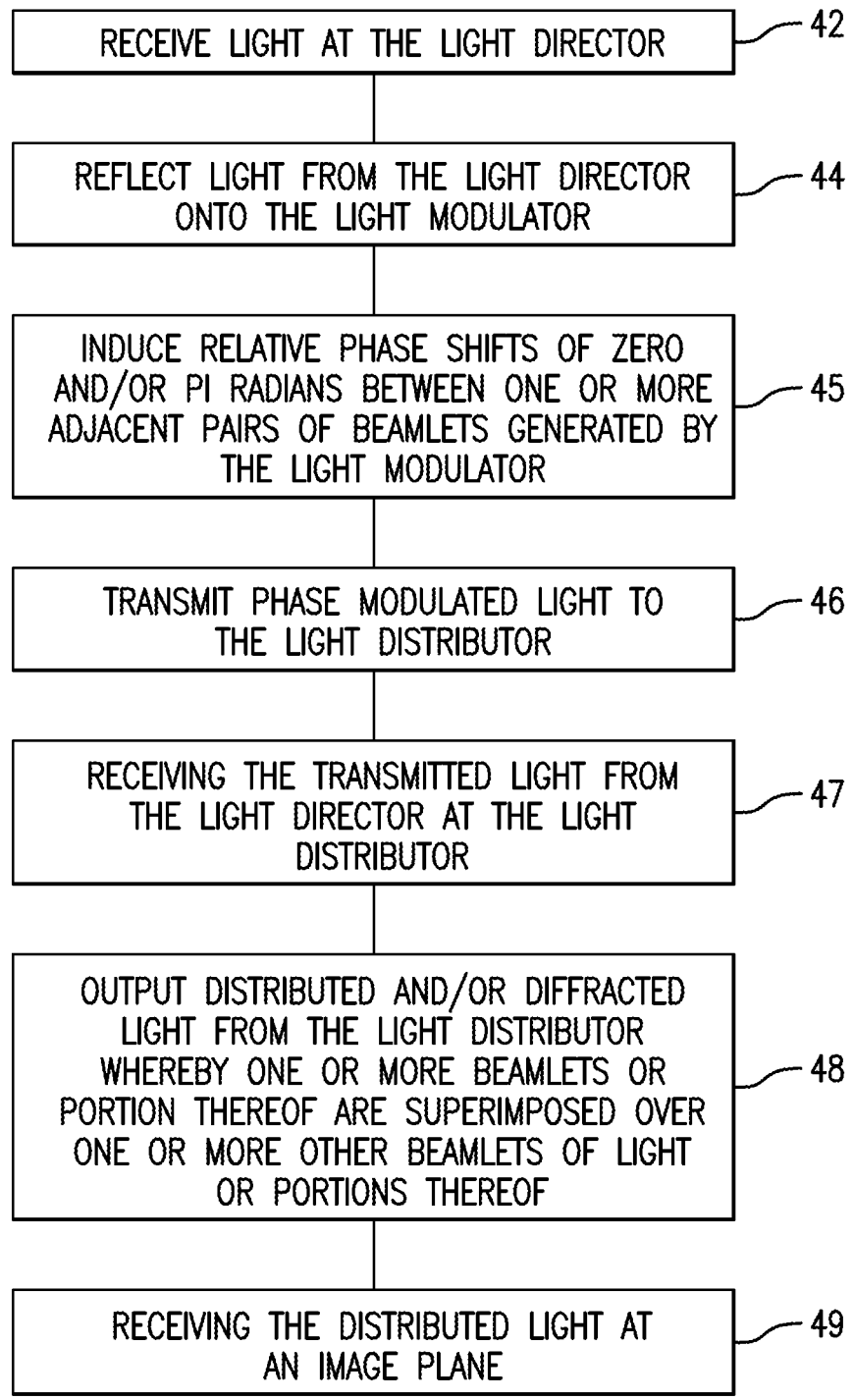
FIG. 4 illustrates a flow chart of a method of illumination in accordance with the present invention.

Shown in FIG. 4 is a method for modulating light 40 in accordance with the present invention. As shown in FIG. 4, in step 42, a light director 32 (e.g., a pair of prisms) may receive light from, for example, an electromagnetic radiation source 12, such as a laser light source. In an embodiment of the present invention the light director 32 reflects and/or transmits light. For example, in step 44, the light director 32 reflects and/or optically couples light from the light director 32 onto the light modulator 14. In an embodiment of the present invention the light director 32 may be utilized to deliver light and/or optically couple light, which it receives from the light source 12, to the light modulator 14 such that the light from the light director 32 arrives at the light modulator 14 normal to or substantially perpendicular to the light modulator 14.

In an embodiment of the present invention, in step 45, relative phase shifts of, for example, zero or pi, are randomly induced between pairs of adjacent beamlets of light at an instant in time, by, for example, control unit/system 15,15', 700, thereby generating phase modulated light. In an embodiment of the present invention, a control unit/system 15,15',700 induces random phase shift patterns in adjacent beamlets of light output by the light modulator 14 by utilizing, for example, phase patterns stored, output, accessed and/or generated by a pattern generator 16 integrated into and/or coupled to the control unit 15.

In step 46, the light director 32 may also be utilized to transmit and/or optically couple the phase modulated light from the light modulator 14 to the light distributor 18. In an embodiment of the present invention the light director 32 may be utilized to deliver light, which it receives from the light modulator 14, to the light distributor 18 such that the light from the light director 32 arrives at the light distributor 18 normal to or substantially perpendicular to the light distributor 18.

In an embodiment of a method 40, in accordance with the present invention, for example an illumination and/or projection method, in step 47, the light distributor 18 may output distributed light (e.g., diffracted and/or reflected light), whereby one or more beamlets of light, or portions thereof, are superimposed over one or more other beamlets of light or portions thereof. In step 49, the superimposed beamlets of light may be received by an image plane 19 (i.e., a plane of an object or a plane in space).

Figure 5:
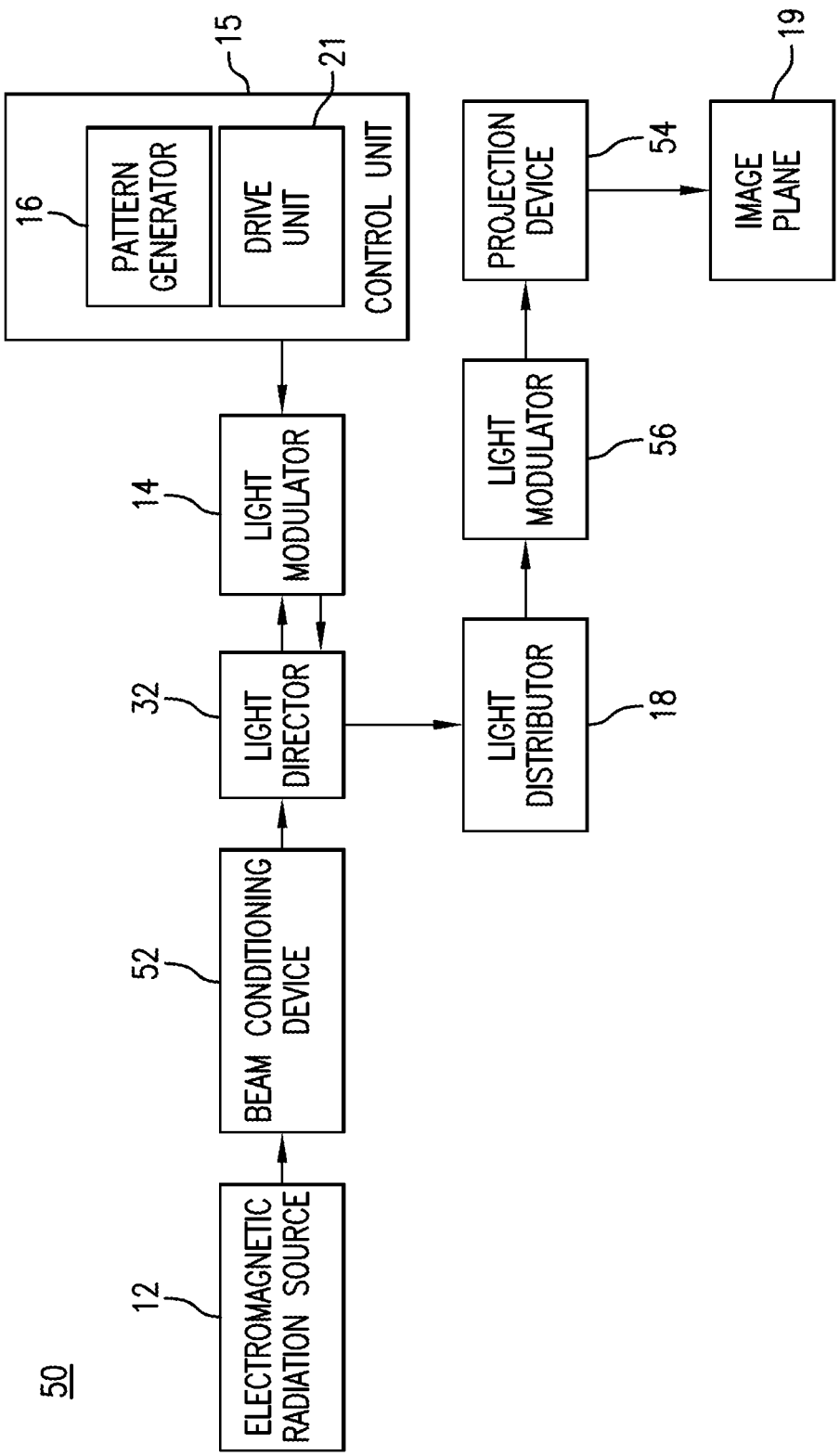
FIG. 5 illustrates a block diagram of an illumination and/or projection system in accordance with the present invention.

Shown in FIG. 5 is an embodiment of a system 50 in accordance with the present invention, for example an illumination and/or projection system. As shown in FIG. 5, a beam conditioning device 52 may be utilized that receives electromagnetic radiation from, for example, an electromagnetic radiation source 12 (e.g., a laser light source) and conditions the beam of light received. In an embodiment of the present invention, the beam conditioning device 52 is an optic device. In an embodiment of a system 50, in accordance with the present invention, the beam conditioning device 52 may be one or more lenses (e.g., one or more collimating lenses and/or other optical elements) that may change and/or modify the size and/or shape of an incoming beam by, for example, collimating, expanding and/or narrowing the incoming beam or beams of light received.

A light director 32 in accordance with an embodiment of the present invention may be utilized to deliver light to a light modulator 14 (for example, a phase-only light modulator) and transmit light from the light modulator 14 to a light distributor 18. In an embodiment of the present invention, the light director 32 transmits and/or optically couples light to the light modulator 14 such that the light arrives or is incident on the light modulator 14 perpendicular (at a ninety degree angle) to or substantially normal to the light modulator 14. The light modulator 14 may then transmit and/or output light to the light distributor 18, for example, perpendicular to or substantially normal to the light distributor 18. In an embodiment of the present invention, the light modulator 14 may transmit and/or output light to the light distributor 18 via, for example, a light director 32.

In an embodiment of the present invention, the system 50 may also include a control unit/system 15,15',700 that is utilized to create relative phase shifts, for example, relative phase shifts of zero and/or pi between one or more pairs of adjacent beamlets of light at an instant in time. The control unit/system 15,15',700 may include a pattern generator 16 and/or a drive unit 21. In an embodiment of the present invention, the pattern generator 16 may store and/or generate one or more phase patterns, for example, one or more predefined patterns, one or more random phase patterns, and/or one or more pseudo random phase patterns that are utilized to determine the relative phase shift relationships between adjacent beamlets of light output by the light modulator 14. In an embodiment of the present invention, the drive unit 21 may drive the light modulator by addressing the pixels and/or pixel groupings of the light modulator 14 to achieve the desired light output (e.g., light having the desired relative phase shifts between beamlets of light).

In an embodiment of the present invention, a light distributor 18 (e.g., a diffractive optical element) may receive light from the light modulator 14 for example, directly and/or indirectly, via the light director 32. In an embodiment of the present invention, the light distributor 18 may be utilized to distribute the light received, by, for example, transforming, diffracting, reflecting and/or spreading the light received. In an embodiment of the present invention, a beam of light, for example, a beam of light with a circular cross-section or elliptical cross-section (e.g., a Gaussian beam of light) may be transformed to some other shape and/or pattern by the light distributor 18. In an embodiment of the present invention, a Gaussian beam of light may be, for example, transformed to a rectangular shape and/or pattern that has uniform intensity or near uniform intensity across the shape and/or pattern.

In an embodiment of the present invention, a second light modulator 56 may receive the patterned and/or shaped light from, for example, the light distributor 18, and generate beamlets of light from the patterned and/or shaped light received. In an embodiment of the present invention, the second light modulator 56 may be, for example, a liquid crystal device, a liquid crystal display, liquid-crystal-on-silicon (LCOS) display, microdisplay, a micro electro-mechanical system (MEMS) display, digital light processing (DLP) display, optically addressed spatial light modulator (OASLM), hologram modulator (e.g., a computer generated hologram (CGH) device) and/or other type of display (e.g., analog, binary, electrically addressed and/or optically addressed display). In an embodiment of the present invention, the second light modulator may be an image forming light modulator that modulates amplitude and/or phase of the beamlets of light and outputs modulated beamlets of light. In an embodiment of the present invention, the electromagnetic radiation modulator 56 (e.g., a light modulator device) may modulate multiple characteristics of incoming electromagnetic radiation (such as light), for example, phase, amplitude, polarization and/or some other characteristic of incoming light.

In an embodiment of the present invention, the second light modulator 56 may transmit the modulated beams of light to, for example, a projection device 54. The projection device 54 may include, for example, one or more lenses, holographic optical elements (HOEs), diffractive optical elements (DOEs) and/or mirrors that are utilized to project an image, created by, for example, the second light modulator 56, onto an image plane 19 (i.e., a plane of an object or a plane in space).

Figure 6:
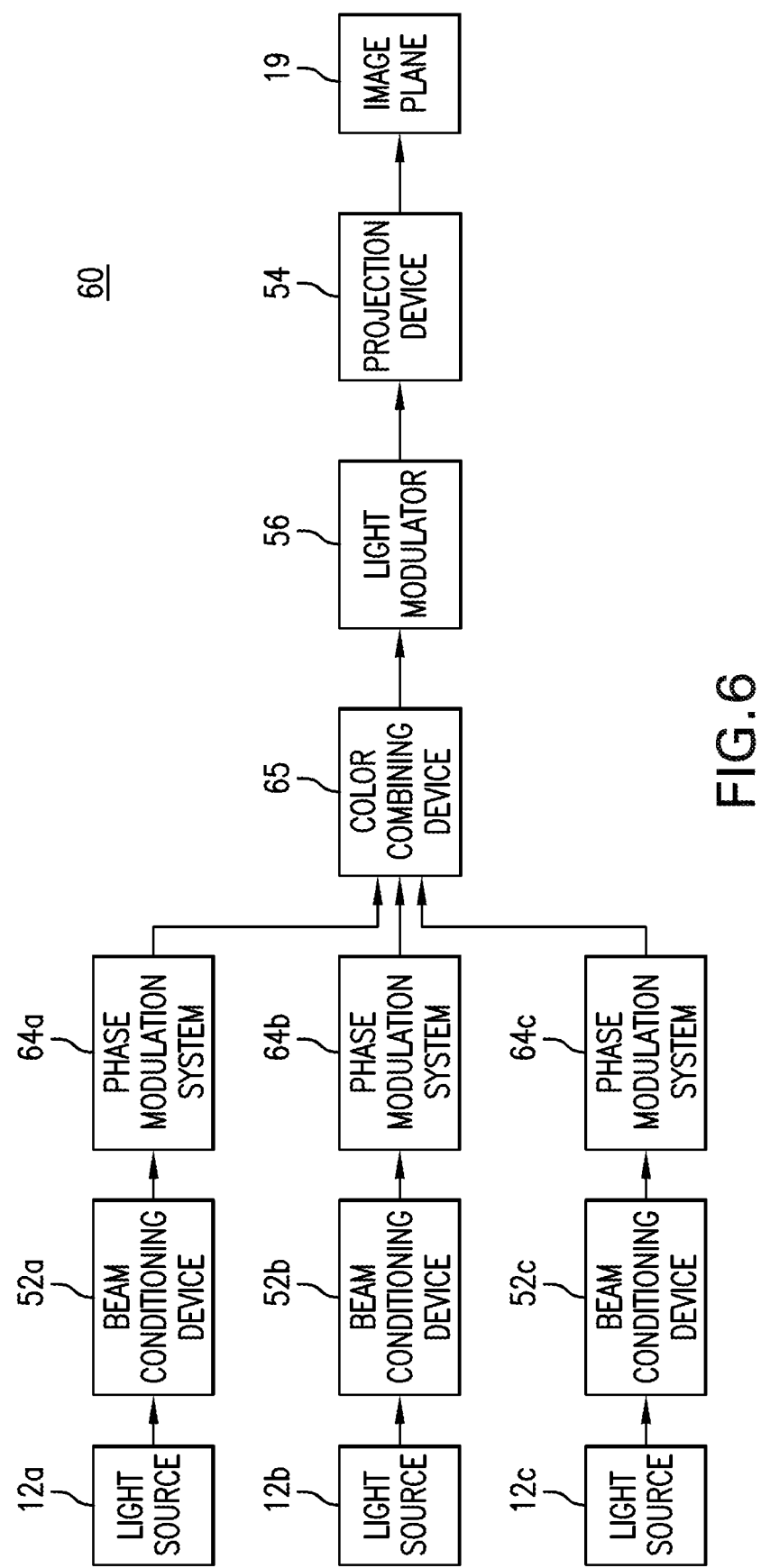
FIG. 6 illustrates a block diagram of an illumination and/or projection system in accordance with the present invention.

Shown in FIG. 6, is an embodiment of a system 60, for example, a projection system, in accordance with the present invention. The projection system 60 may include one or more light sources 12a,12b,12c, for example three laser light sources. The projection system may also include one or more beam conditioning devices 52a,52b,52c, for example, beam conditioning optic devices. In an embodiment of the present invention, the one or more beam conditioning devices 52a,52b,52c may be one or more collimating lenses.

In an embodiment of the present invention, the one or more beam conditioning devices 52a,52b,52c may be one or more lenses that collimate, expand and/or narrow the beam or beams of light received. The beam conditioning devices 52a,52b,52c may be utilized, for example, to deliver light and/or optically couple light to one or more phase modulation systems 64a,64b,64c.

In an embodiment of the present invention, the one or more phase modulation systems 64a,64b,64c may each include, for example, a control unit/system 15,15',700, light modulator 14, light director 32, and/or light distributor 18, that may operate, individually and/or in conjunction with each other, as illustrated and described herein with reference to, but not limited to, FIGS. 1A, 3A-3C, 5, 7B, and 9-11.

The system 60 in accordance with the present invention may include a color combining device 65, for example, a mirror that receives light, directly and/or indirectly, from the one or more phase modulation systems 64a,64b,64c. In an embodiment of a projection system 60, in accordance with the present invention, the color combining device 65 is a dichroic mirror.

The system 60 may also include a second electromagnetic modulator 56, for example, a second light modulator (e.g., a liquid crystal device, a liquid crystal display, liquid-crystal-on-silicon (LCOS) display, microdisplay, a micro electro-mechanical system (MEMS) display, digital light processing (DLP) display, optically addressed spatial light modulator (OASLM), holographic modulator (e.g., a computer generated hologram (CGH) device) and/or other type of display (e.g., analog, binary, digital, electrically addressed and/or optically addressed display). In an embodiment of the present invention, the second light modulator 56 may be an image forming light modulator. The second light modulator 56 may modulate the amplitude and/or phase of the light output from the color combining device 65. In an embodiment of the present invention, the system 60 may include a projection device 54 that may project a light image, received from the second light modulator 56, onto an image plane 19 (i.e., a plane of an object or a plane in space).

Figure 7A:
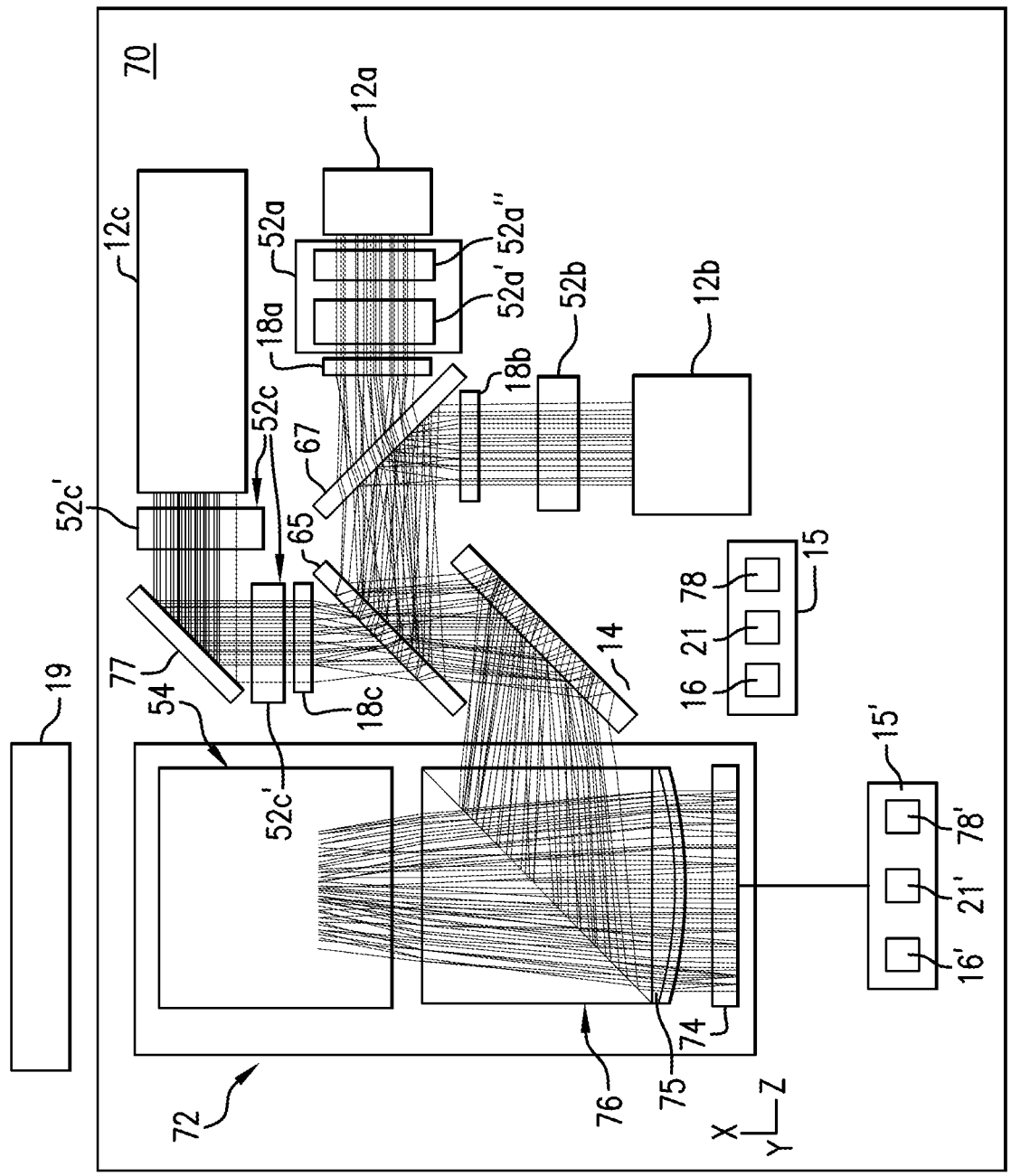
FIG. 7A illustrates a block diagram of an illumination and/or projection system in accordance with the present invention.

Shown in FIG. 7A, is a system 70, in accordance with the present invention that may include at least two light modulators 14,74. For example, FIG. 7A illustrates a system 70, in accordance with the present invention, that may include at least one electromagnetic radiation source 12a,12b,12c and at least one electromagnetic radiation distributor 18a, 18b,18c (e.g., light distributor). Shown in FIG. 7A, are three light distributors 18a,18b,18c that each receive light from three light sources 12a, 12b, 12c (e.g., laser light sources corresponding to red, blue, and green light sources, respectively), directly or indirectly (e.g., indirectly via beam conditioning devices/systems 52a,52b,52c (e.g., one or more optic devices 52a', 52", 52b', 52b",52c' and 52c")). In an embodiment of the present invention, the one or more beam conditioning devices 52a,52b,52c may be or include one or more collimating lenses 52a', 52", 52b', 52b",52c' and 52c". For example, as shown in FIG. 7A, each beam conditioning device/system 52a,52b,52c may include two optical devices 52a', 52", 52b', 52b",52c' and 52c", for example, collimating lenses, respectively. In an embodiment of the present invention, the one or more beam conditioning devices 52a,52b, 52c are optic devices that are made from, for example, a type of glass of plastic and/or glass. However, it would be obvious to one of ordinary skill in the art that the number, construction material, and type of beam conditioning devices 52 may vary.

In an embodiment of a system 70, in accordance with the present invention, a combining device 65, for example, a combining optic device, may be utilized to combine electromagnetic radiation (e.g., light) originating from two (2) or more sources of electromagnetic radiation 12a,12b,12c (e.g., laser light sources) and generate combined electromagnetic radiation (e.g., combined light). The combining device 65 may be, for example, an optic device that includes one or more lenses, holographic optical elements, mirrors, prisms, fibers, and/or other optical elements. In an embodiment of a system 70, for example, a projector system, in accordance with the present invention, the combining device 65 may be one or more dichroic mirrors. As shown in FIG. 7A, the combining device 65 may be utilized to combine light from, for example, two (2) or more light sources 12a,12b,12c. In an embodiment of the present invention, the combining device may combine, for example, two or more same and/or different colors of light. For example, as shown in FIG. 7A, in a system 70, in accordance with the present invention, may include a first light modulator 14 that receives light from the combining device 65. In an embodiment of the present invention, the light modulator 14 is positioned such it is at an angle alpha ($\alpha$), for example, an angle of forty-five degrees or approximately forty-five degrees with a horizontal plane and/or horizontal planar surface or substantially horizontal plane and/or horizontal planar surface.

In an embodiment of a system 70, in accordance with the present invention, the combined electromagnetic radiation (e.g., light) may be modulated by the light modulator 14, for example, phase modulated, after the light has been distributed (e.g., diffracted and/or reflected) by the one or more light distributors 18a,18b,18c. In an embodiment of the present invention, a control unit/system 15,15',700 may address one or more pixels of the light modulator 14 such that a relative phase shift between one or more pairs of adjacent beamlets of light output from the light modulator 14, is, for example, zero or pi, at an instance in time.

An embodiment of a system in accordance with the present invention may also include a projection subassembly 72. In an embodiment of a system in accordance with the present invention, the projection subassembly 72 may include a second electromagnetic radiation modulator 74 (e.g., a second light modulator), a lens device 75, a polarizer, analyzer, and/or polarization analyzer 76, and a viewing optic device 54 (e.g., a lens, a projection lens, eyepiece, eyewear lens, or headgear lens). In an embodiment of the present invention, the lens device 75, polarizer, analyzer, and/or polarization analyzer 76, and/or the second light modulator 74 may be external to the projector subassembly 72. In an embodiment of the present invention, the lens device 75 may comprise one or more lenses, mirrors, and/or other devices (e.g., optic devices). In an embodiment of the present invention, the second light modulator 74 may be, for example, a liquid crystal device, LCD, LCOS, MEMS, DLP, or other type of display. The second light modulator 74 may be a display that is utilized alone, and/or in conjunction with another device, to modulate an amplitude and/or phase of the beamlets of light generated by the light modulator 74. In an embodiment of the present invention, the second light modulator 74 may modulate the amplitude of incoming light and/or be an image forming display.

In an embodiment of a system 70, in accordance with the present invention, light from the light modulator 14 may be transmitted directly and/or indirectly (e.g., via the lens device 75 and/or one or more components of the analyzer 76) to a second electromagnetic radiation modulator 74 (e.g., a second light modulator). In an embodiment of the present invention, one or more control units 15, 15' may modulate an amplitude and/or phase of beamlets of light output from the second light modulator 74. In an embodiment of the present invention, the second light modulator outputs one or more amplitude modulated beamlets of light corresponding to one or more pixels of the second light modulator 74.

In an embodiment of a system in accordance with the present invention, the polarizer, analyzer, and/or polarization analyzer 76 (for example, one or more TIR prisms or any other optical element that may be utilized for image creation) may receive light from the second electromagnetic radiation modulator 74, directly or indirectly (e.g., via a lens 75, such as a convex lens, and/or one or more components of the analyzer 76). In an embodiment of the present invention, the polarization analyzer 76 may transmit (e.g., emit) and/or block electromagnetic radiation (e.g., light) of a particular polarity. An embodiment of a system 70, in accordance with the present invention, may include a projection device 54, for example, one or more lenses and/or mirrors that may be utilized to project an image (e.g., an image created by the second light modulator 74 and/or co-created by the second light modulator 74 and one or more other devices). In an embodiment of the present invention, the projection device 54 may project the image onto an image plane 19 (i.e., a plane of an object or a plane in space).

An embodiment of a system 70, in accordance with the present invention, may also include other lenses and/or mirrors (e.g., concave and/or convex lenses and mirrors), for example, to direct light. For example, a system 70, in accordance with the present invention, may also include a mirror 67 that may transmit a first light color (e.g., blue) and reflect a second light color (i.e., a same or different color as the first light color, such as red) onto, for example, the combining device 65. In an embodiment of a system in accordance with the present invention, a mirror may be utilized to transmit light having a certain characteristic or characteristics (for example, color, polarization, wavelength, etc.) and reflect light having a same and/or different characteristic or characteristics (for example, color, polarization, wavelength, etc.).

A projection system 70, in accordance with the present invention, may also include a second mirror 77. In an embodiment of a system 70, in accordance with the present invention, the second mirror 77 may be utilized to transmit, reflect, and/or direct the light from, for example, a third light source 12*c*, or a device associated with the third light source, for example, beam conditioning device 52*c*', to the color combining device 65 directly or indirectly (e.g., via beam conditioning device 52" and/or light distributor 18*c*). For example, in an embodiment of a system 70, in accordance with the present invention, the second mirror 77 may be utilized to transmit light to a light distributor 18*c* by reflecting light from a surface of the second mirror 77. In an embodiment of the present invention, the second mirror 77 may be utilized as a folding mirror to make the system 70 compact.

Figure 7B:
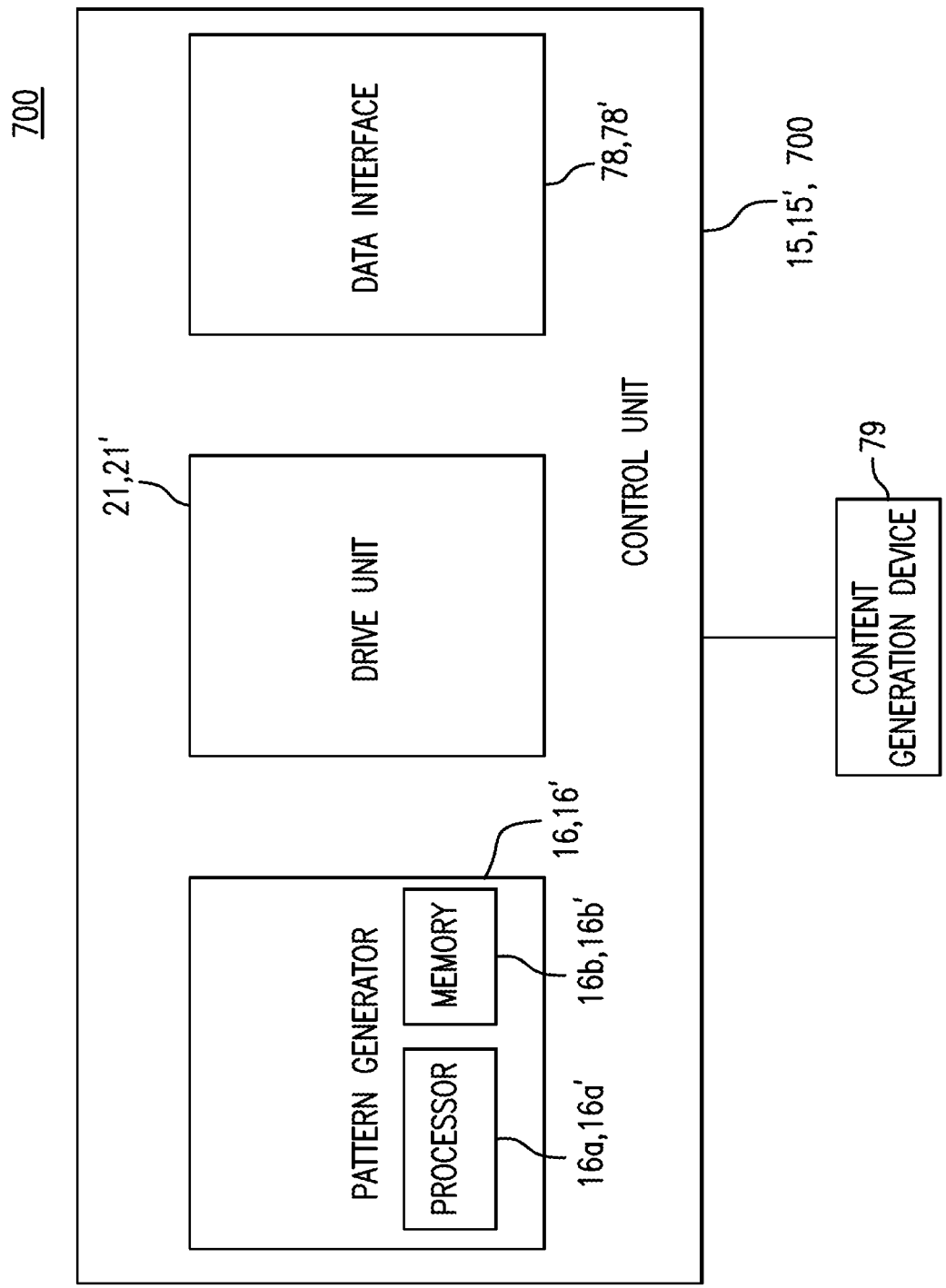
FIG. 7B illustrates a control system in accordance with the present invention.

In an embodiment of a system 70 in accordance with the present invention, each of the first and second light modulators 14,74 may be connected to one or more control devices or systems 15,15',700. As shown in FIG. 7A, in an embodiment of the present invention, each control unit/system 15,15',700 (element 700 is shown in FIG. 7B) may include, for example, a pattern generator 16,16' and/or a drive unit 21,21'. The drive unit 21,21' may store, receive, access, and/or format, data, for example, phase pattern data and/or amplitude data output, stored, generated and/or accessed by the pattern generator 16*a*,16*a*', and the drive unit 21,21' may utilize the phase pattern data to address the pixels and/or write to the pixels, such that a phase pattern (e.g., a relative phase shift pattern) is induced in the beamlets of light that correspond to the respective pixels. In an embodiment of the present invention, a drive unit 21,21' may include, for example, one or more integrated and/or discrete circuits (e.g., digital, analog, and/or mixed signal circuits). In an embodiment of the present invention, the control unit/system 15,15',700, pattern generator 16*a*,16*a*', and/or drive unit 21,21' may include, for example, one or more processors (e.g., one or more integrated circuits, one or more microprocessors, one or more application-specific integrated circuits (ASIC), one or more field programmable gate arrays (FPGAs), and/or one or more custom integrated circuits) that address the pixels of the respective light modulator. In embodiments of the present invention, the control unit/system 15,15',700, pattern generator 16,16', and/or drive unit 21,21' may include one or more memory devices and/or may be coupled to one or more external memory devices.

In an embodiment of the present invention, the drive unit 21,21' includes one or more application-specific integrated circuits (ASICs). However, it would be understood by one of ordinary skill in the art that the drive unit 21,21' may include, for example, one or more programmable and/or application specific logic devices and/or integrated circuits or combination of circuits, for example, processing and/or memory circuits (i.e., circuits that may include, for example, ASIC, FPGA, ROM, RAM, EPROM, and/or EEPROM devices).

A system 70 in accordance with the present invention, may include, for example, a control unit/system 15,15',700 that may be utilized to modulate, for example, the phase and of beamlets of light generated by the light modulator 14 and/or a control unit/system 15,15',700 that may be utilized to, for example, modulate the amplitude and/or phase of beamlets of light generated by the light modulator 74.

In an embodiment of the present invention, as shown in FIG. 7B, a control unit/system 700 may include a pattern generator 16,16', drive unit 21,21', and a data interface device 78,78'. In an embodiment of the present invention, for example, the data interface device 78,78' may receive despeckle pattern sequences, in the form of video (e.g., video data and/or images encoding relative phase shift patterns) to be induced in the light modulator 14. In an embodiment of the present invention, the data interface device 78,78' may be configured, for example, to receive video signals. In an embodiment of the present invention, the data interface device 78,78' may be, for example, a digital visual interface (DVI), high definition multimedia interface (HDMI), mobile industry processor interface (MIPI), DisplayPort, low-voltage differential signaling (LVDS) interface, video graphics array (VGA) interface, a digital RGB interface and/or some other data interface (e.g., any data interface device that receives video signals and/or data). It should be understood by one of ordinary skill in the art that the type of data interface device may vary.

In an embodiment of the present invention, a light modulator 74 may be utilized to, for example, encode one or more target colors of at least a portion of an image and/or image data received, such that beamlets of light corresponding to the encoded colors and/or grayscale are emitted from the light modulator 74. In an embodiment of the present invention, the control unit 15,15', for example, may include a data interface device 78,78'. In an embodiment of the present invention the control unit/system 15,15',700 may receive data, (e.g., specifications regarding the characteristics of beamlets of light that are to be output from the respective light modulator 14,74), convert and/or format data. In embodiments of the present invention, data may be video data and/or images. In an embodiment of the present invention, the control unit/system 15,15',700 may be utilized to address one or more pixels of the one or more light modulators 14,74 such that light output from the respective light modulator 14,74 has the characteristics included in the data and/or incoming data (e.g., data that includes desired outputs by one or more light modulators 14, 74, such as an amount, an intensity, a color, and/or a phase relationship between adjacent beamlets of light or groupings of beamlets of light).

A pattern generator 16,16' may be coupled to one or more control units/systems 15,15',700, by wireline or wireless coupling, or integrated into one or more control units 15,15',700. In an embodiment of the present invention, as shown in FIG. 7B, the pattern generator 16,16' may also be coupled to and/or include one or more devices, for example, one or more computing devices 16a,16a' (i.e., processor, CPU, and/or computing devices) that generate relative phase shift patterns and/or controls the pattern generator 16,16'. In an embodiment of the present invention, as shown in FIG. 7B, a pattern generator 16,16' may be coupled to and/or include one or memory devices 16b,16b' that store one or more relative phase shift patterns. In an embodiment of the present invention, the pattern generator 16,16' may receive, output, access and/or store one or more predetermined phase patterns or random phase patterns. In an embodiment of the present invention, the pattern generator 16,16' may be external to the control unit/system 15,15',700. In an embodiment of the present invention, the pattern generator 16,16' may be a random pattern generator. In an embodiment of the present invention, the pattern generator 16,16' may receive, generate, store, access, and/or output one or more Hadamard patterns and/or other computer calculated random and/or pseudo phase patterns. In an embodiment of the present invention, the pattern generator 16,16' may be a computer software module and/or circuit assembly that outputs one or more phase patterns (e.g., one or more relative phase shift patterns). In an embodiment of the present invention, the pattern generator 16,16' is external to the control unit/device/system 15,15',700, respectively. In an embodiment of the present invention, the pattern generator 16,16' may be any device that generates and/or outputs a video signal and/or video data having the desired phase pattern or relative phase relationships between adjacent pixels and/or groupings of pixels. The video signal, may be, for example, compatible with video display interface technologies, such as digital visual interface (DVI), high definition multimedia interface (HDMI), mobile industry processor interface (MIPI), DisplayPort, low-voltage differential signaling (LVDS), video graphics array (VGA), digital RGB and/or other data and/or video transmission protocols.

In an embodiment of a system in accordance with the present invention, the pattern generator 16,16' may be a configurable random pattern generator. For example, the pattern generator 16,16' may be configured and/or designed to generate relative phase shift patterns for groupings of pixels, by performing horizontal, vertical, arbitrary, and/or selective scaling of the pixels. For example, the pattern generator 16 may be configured to group pixels, which are aligned vertically or horizontally, together such that the pattern generator outputs a phase pattern corresponding to the groups of vertically or horizontally aligned pixels of the light modulator (e.g., light modulator 14). Consequently, for example, a pattern generator 16,16' may generate relative phase shifts between groupings of pixels/beamlets of light of the light modulator 14 (e.g., horizontal and vertical groupings of pixels/beamlets of light). By creating phase shifts between groupings of pixels, rather than individual pixels, diffraction losses are minimized.

In an embodiment of the present invention, the pattern generator 16,16' may be configured to refresh (i.e., change the phase pattern that is output) at one or more refresh rates (i.e., how often the phase pattern is generated and/or output).

In an embodiment of the present invention, the pattern generator 16,16' may be configured to output a phase pattern that compensates for undesired light output patterns by the light modulator. For example, a pattern generator 16,16' may receive light modulator data regarding one or more characteristics of light output from the light modulator 14,74. The light modulator data may be generated by the light modulator 14,74 and/or may be received at the pattern generator 16,16' (or a CPU and/or memory device associated with the pattern generator 16,16') from, for example, a source and/or input external to the light modulator 14,74. The pattern generator 16,16' may be utilized to bias a phase pattern of beamlets of light output by, for example, light modulator 14,74. For example, in an embodiment of the present invention, the light modulator data is intensity data regarding some or all of the light output by the light modulator 14,74, and the pattern generator 16,16' generates a phase pattern that causes an intensity of the light, for all or portions of the light output from the light modulator 14,74, to increase, decrease and/or cause to stay the same at an instance in time. By biasing a phase pattern, for example, based on a particular state and/or anticipated state of a light modulator 14, 74, compensation for undesired light output patterns, for example, irregularities and/or asymmetries in the light output pattern by a light modulator 14,74, is achieved.

In a system in accordance with the present invention, as shown in FIG. 7B, a control system 700 may include, for example, one or more control units 15,15', one or more pattern generators 16,16', and/or one or more drive units 21,21' and/or one or more data interfaces 78,78'. In an embodiment of the present invention, one or more components of the control system 700, may be coupled to and/or integrated into one or more components of a phase modulation, illumination, and/or projection system of the present invention.

A control system 15,15',700, in accordance with the present invention, may also include or be coupled to a content generation device 79 that generates, for example, video, one or more images, video data, video/video data having a despeckle relative phase shift pattern, and/or image data). In an embodiment of the present invention, the content generation device 79 may be, for example, a computer, video projector, movie projector, Blu-ray player, gaming device, digital camera, video camera, VCR, DVD player, and/or other device that generates or is capable of generating video and/or image data. It would be understood by one of ordinary skill in the art that there may be other examples of content generation devices.

Figure 8:
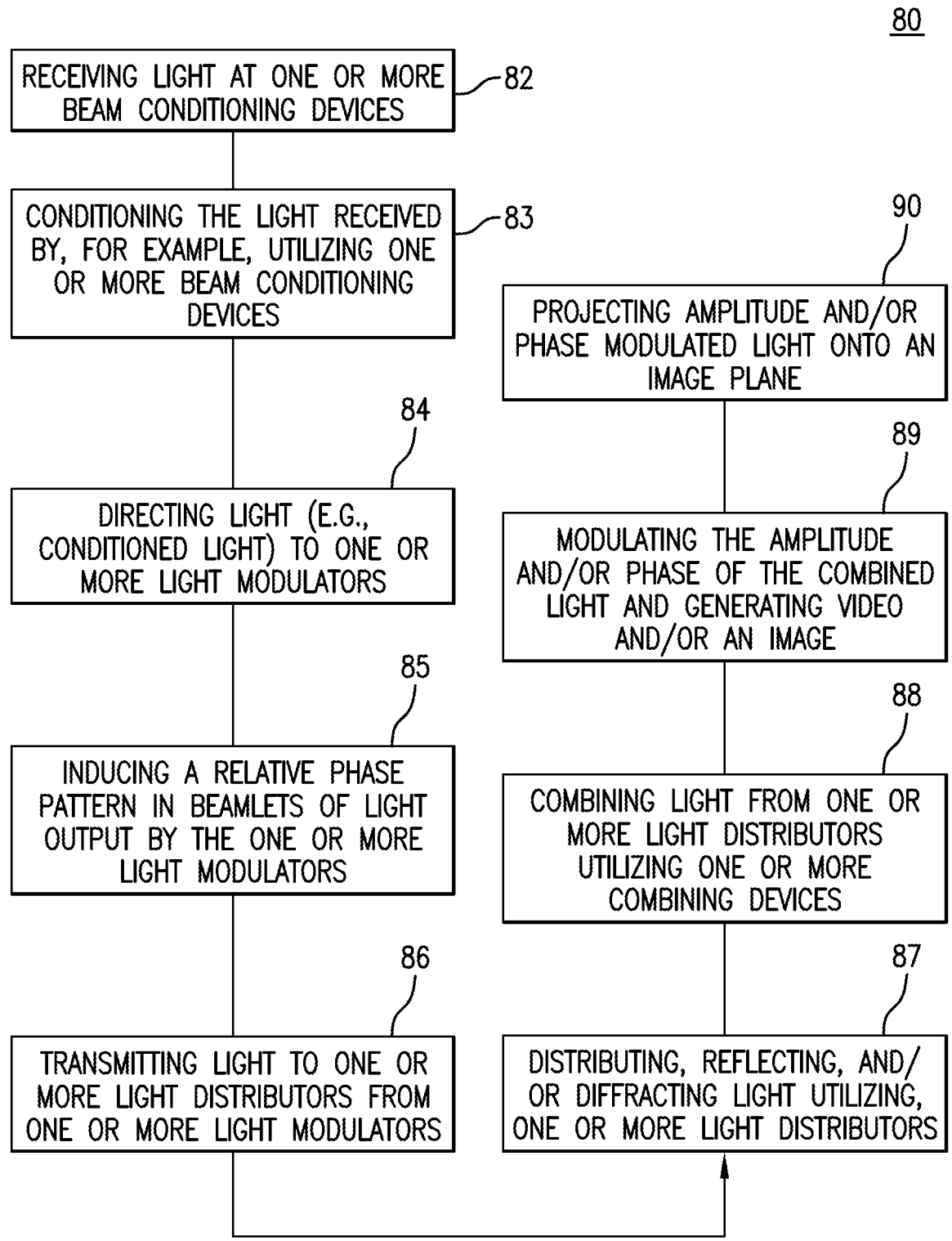
FIG. 8 illustrates a flow chart of a method of illumination and/or projection in accordance with the present invention.

Shown in FIG. 8 is a flow chart illustrating a method 80, for example, an illumination and/or projection method in accordance with the present invention. The method shown in FIG. 8 may include, in step 82, receiving electromagnetic radiation, for example, light from one or more light sources 12a,12b,12c, at one or more beam conditioning devices 52a,52b,52c. In step 83, a method 80, in accordance with the present invention, may include conditioning (e.g., collimating, expanding and/or narrowing) the light received, by, for example, utilizing the one or more beam conditioning devices 52a,52b,52c. A method 80, in accordance with the present invention, may also include, in step 84, directing light, for example, light from a light source 12a,12b,12c and/or a beam conditioning device 52a,52b,52c to a light modulator 14a,14b,14c. For example, step 84 may involve receiving the light at one or more light directors 32a,32b,32c from the one or more light sources 12a,12b,12c and/or the one or more beam conditioning devices 52a,52b,52c, and utilizing the one or more light directors 32a,32b,32c to transmit and/or optically couple light to one or more light modulators 14a,14b,14c. In an embodiment of a method 80, in accordance with the present invention, step 85 may involve inducing relative phase shifts of, for example, relative phase shifts of zero and/or pi radians, between one or more pairs of adjacent beamlets of light generated and/or output by the one or more light modulators 14a,14b,14c, and generating first modulated light (e.g., phase modulated light). In an embodiment of the present invention, one or more control units/systems 15,15',700 are utilized to induce relative phase shifts, for example, relative phase shifts of zero and/or pi radians between pairs of adjacent beamlets of light generated and/or output by the one or more light modulators 14a,14b,14c. The method 80 may also include, in step 86, transmitting light, directly or indirectly, from the one or more light modulators 14 to one or more light distributors 18a,18b,18c, for example, by utilizing the one or more light directors 32a,32b,32c. A method 80, in accordance with the present invention, may involve, in step 87, distributing, reflecting, and/or diffracting light by, for example, utilizing the one or more light distributors 18a, 18b,18c (e.g., diffractive optical elements). In an embodiment of the present invention, the one or more light distributors 18a,18b,18c may be diffractive homogenizers. A method 80 in accordance with the present invention may include, in step 88, combining light, for example, distributed, diffracted, and/or reflected light from one or more light distributors 18a,18b,18c, for example, by utilizing a combining device 65 (e.g. a combining optic device). In an embodiment of the present invention, the combining device 65 may be a color combining device that combines more than one similar and/or different frequencies of electromagnetic radiation (e.g., colors of light). In an embodiment of a method in accordance with the present invention, step 89 may involve modulating the amplitude and/or phase of the light received, directly or indirectly, from, for example, combining device 65, and generating second modulated light. In an embodiment of a method 80, in accordance with the present invention, one or more second light modulators 56,74 may receive light from, for example, respective one or more light distributors 18a,18b,18c and/or one or more combining devices 65, and modulate the amplitude of one or more of the beamlets of light output by the pixels of the one or more respective light modulators 14a,14b,14c, thereby generating amplitude modulated light (e.g. video and/or one or more single images). In step 90, a method 80, in accordance with the present invention, may, for example, include projecting the second modulated light (e.g., the amplitude modulated light onto an image plane 19 (i.e., a plane of an object or a plane in space)). In an embodiment of a method 80, in accordance with the present invention, a projection device 54, for example, receives the second modulated light (e.g., amplitude modulated light) and projects the second modulated light onto an image plane 19. In an embodiment of the present invention, a system and or method, in accordance with the present invention (e.g., illumination and/or projection methods in accordance with the present invention) may be utilized to illuminate an image plane 19 and/or project to an image plane 19, for example, illuminate and/or project to a display (e.g., a viewing display), a screen, a windshield, a head-up display, a head-mounted display, a display of a handheld device, a display of a mobile device, a display of a personal computing device, a display associated with a gesture tracking device, a display associated with an eyewear device, a display associated with a headgear device, and/or other surface and/or plane onto which an image may be projected, including, but not limited to, a surface in an ambient environment (e.g., a plane in space that may be utilized for displaying a hologram). Other examples of display products in which systems and/or methods in accordance with the present invention (e.g., illumination systems and/or projection systems, in accordance with the present invention) may be utilized in and/or utilized or in conjunction with, include, but is not limited to, other projectors, televisions, computer monitors, near-eye displays, virtual reality displays, hyper-reality displays, and/or mixed reality displays.

In an embodiment of an illumination system or projection system in accordance with the present invention, a light distributor 18 (e.g., a diffractive homogenizer) may be utilized to distribute light received, directly or indirectly, from the light modulator 14, and may be designed to homogenize, transform, distribute, reflect, and/or diffract light of a particular wavelength or wavelength range. For example, in an embodiment of the present invention, when a red or substantially red laser is utilized as a light source 12a,12b,12c, a light distributor 18a,18b,18c may be utilized that is particular to the red or substantially red laser 12a, 12b,12c. For example, in an embodiment of the present invention, a light distributor 18a may be utilized that is made from fused silica, for example a piece of fused silica that is or is substantially 0.5 millimeters thick. In an embodiment of the present invention, light source 12 may be a red laser light source. It would be understood by one ordinary skill in the art that the size of a light distributor 18 (e.g., light distributor 18a,18b,18c) may vary. It would also be understood by one of ordinary skill in the art that the material utilized for the light distributor 18 (e.g., light distributor 18a,18b,18c) could be silica and/or any other transparent or reflective material.

In an embodiment of the present invention the light distributor 18a may be designed to diffract light red light and/or substantially red light, for example, light having a wavelength of 638 nm and/or approximately 638 nm. The light distributor 18a may be designed with a coating, for example, an anti-reflection coating having an Rp,Rs<0.2% for 638±10 nm @ 0° Angle of Incidence (and said anti-reflection coating is on one or more non-etched sides). The light distributor 18a may also have a design that accommodates an input beam having or substantially having a diameter of 2.5 mm or approximately 2.5 mm, and is collimated, pseudo-collimated, or collimated in part. In an embodiment of the present invention, an input beam is pseudo-collimated by the light distributor 18a. The light distributor 18a may also have a design that may, for example, homogenize, transform and/or diffract the input beam, and output a beam having a pattern that is for example, rectangular and is or approximately is 6.3 mm×3.5 mm homogenized. In an embodiment of the present invention, the propagation distance achieved by, for example, the light distributor 18a is or approximately is 21 mm or approximately 21 mm. In an embodiment of the present invention, a sampling size (e.g., phase or grid size) is or approximately is 1.25 micrometers. The light distributor 18a may also have eight levels. In embodiments of the present invention, one or more masks are used to form the light distributor 18a. In an embodiment of the present invention, three masks may be utilized, for example a first mask having an etch depth of 698.042 nm or substantially 698.042 nm; a second mask having an etch depth of 349.021 nm or approximately 349.021 nm; and a third mask for having an etch depth of 174.510 nm or approximately 174.510 nm.

In an embodiment of the present invention, when a blue or substantially blue laser is utilized as a light source 12a,12b,12c, a light distributor 18a,18b,18c may be utilized that is particular to the blue or substantially blue laser. In an embodiment of the present invention, light source 12b may be a blue laser light source and light distributor 18b may designed to accommodate light originating from a blue laser light source 12b. For example, in an embodiment of the present invention, a light distributor 18b may be utilized that is made from fused silica, for example a piece of fused silica that is or is substantially 0.5 millimeters thick.

In an embodiment of the present invention the light distributor 18b is designed to diffract blue light and/or substantially blue light at 450 nm and/or approximately 450 nm. The light distributor 18b may be designed with a coating, for example, an anti-reflection coating having an Rp,Rs<0.2% for 450±10 nm @ 0° Angle of Incidence (and said anti-reflection coating is on one or more non-etched sides). The light distributor 18b may also have a design that accommodates an input beam having or substantially having a diameter of 2.5 mm or approximately 2.5 mm, and is collimated, pseudo-collimated, or collimated in part. In an embodiment of the present invention, the input beam is pseudo-collimated. The light distributor 18b may also have a design that homogenizes, transforms, reflects, distributes, and/or diffracts the input beam and outputs a beam having a pattern that is for example, rectangular and is or approximately is 6.3 mm×3.5 mm homogenized. In an embodiment of the present invention, the propagation distance achieved by the light distributor 18b is 21 mm or approximately 21 mm. In an embodiment of the present invention, a sampling size is or approximately is 1.25 micrometers. The light distributor 18b may also have eight levels. In embodiments of the present invention, one or more masks are used to form the light distributor 18b. In an embodiment of the present invention, three masks may be utilized, for example a first mask having an etch depth of 483.150 nm or approximately 483.150 nm; a second mask having an etch depth of 241.575 nm or approximately 241.575 nm; and a third mask for having an etch depth of 120.787 nm or approximately 120.787 nm.

In an embodiment of the present invention, when a green or substantially green laser is utilized, for example, as a light source 12a,12b,12c, a light distributor 18a,18b,18c may be utilized that is particular to the green or substantially green laser. In an embodiment of the present invention, light source 12c may be a green laser light source and light distributor 18c may be designed to be utilized in conjunction with a green laser light source 12c. For example, in an embodiment of the present invention, a light distributor 18c may be utilized that is made from fused silica, for example a piece of fused silica that is or is substantially 0.5 millimeters thick.

In an embodiment of the present invention the light distributor 18c is designed to diffract green light and/or substantially green light at 532 nm and/or approximately 532 nm. The light distributor 18c may be designed with a coating, for example, an anti-reflection coating characterized by having an Rp,Rs<0.2% for 532±10 nm @ 0° Angle of Incidence (and said anti-reflection coating is on one or more non-etched sides). The light distributor 18c may also have a design that accommodates an input beam having or substantially having a diameter of 2.5 mm or approximately 2.5 mm, and is collimated, pseudo-collimated, or collimated in part. In an embodiment of the present invention, the input beam is pseudo-collimated. The light distributor 18c may also have a design that homogenizes, transforms, reflects, distributes, and/or diffracts the input beam and outputs a beam having a pattern that is for example, rectangular and 6.3 mm×3.5 mm homogenized. In an embodiment of the present invention, the propagation distance achieved by the light distributor 18c is 15 mm or approximately 15 mm. In an embodiment of the present invention, a sampling size is or approximately is 1.25 micrometers. The light distributor 18c may also have eight levels. In embodiments of the present invention, one or more masks are used to form the light distributor 18c. In an embodiment of the present invention, three masks may be utilized, for example a first mask having an etch depth of 577.216 nm or approximately 577.216; a second mask having an etch depth of 288.608 nm or approximately 288.608 nm; and a third mask for having an etch depth of 144.304 nm or approximately 144.304 nm. However, it would be understood by one of ordinary skill in the art that the type of material for the light distributor 18, the size of the input beam, the number of masks utilized for forming the light distributor, the etch depth, the propagation distance, and/or dimensions of the light distributor 18 may vary. It would also be understood by one of ordinary skill in the art that the pattern of light output by the light distributor 18 may vary in size and/or shape.

Figure 9A:
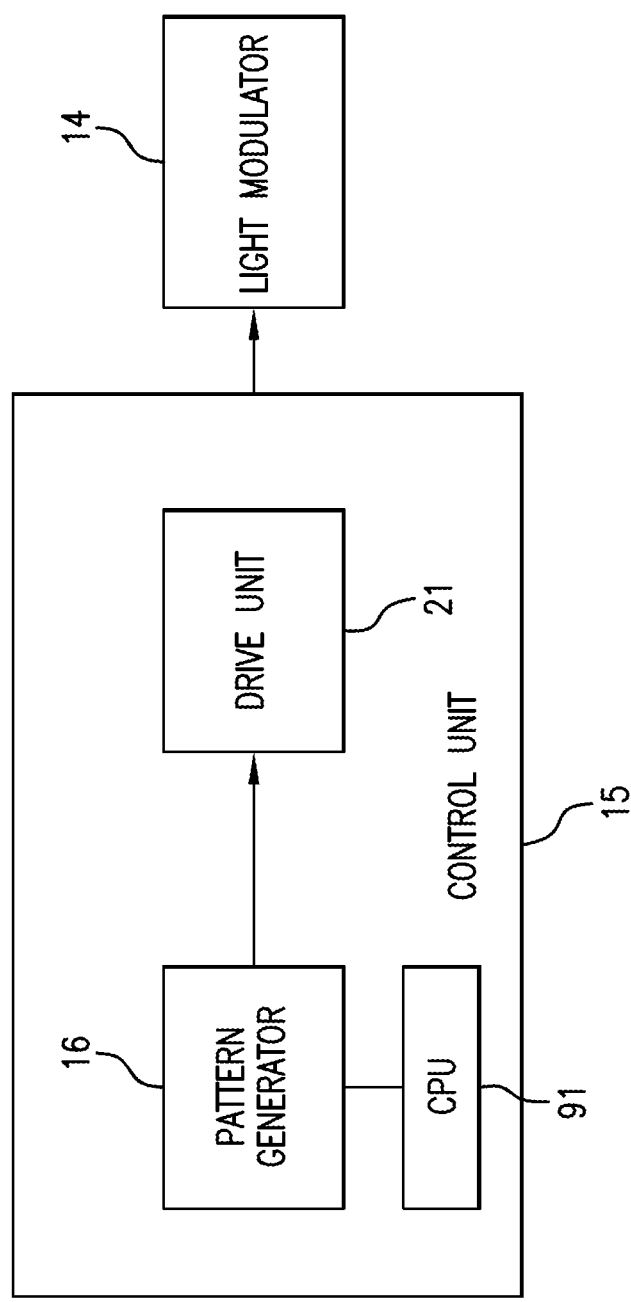
Figure 9B:
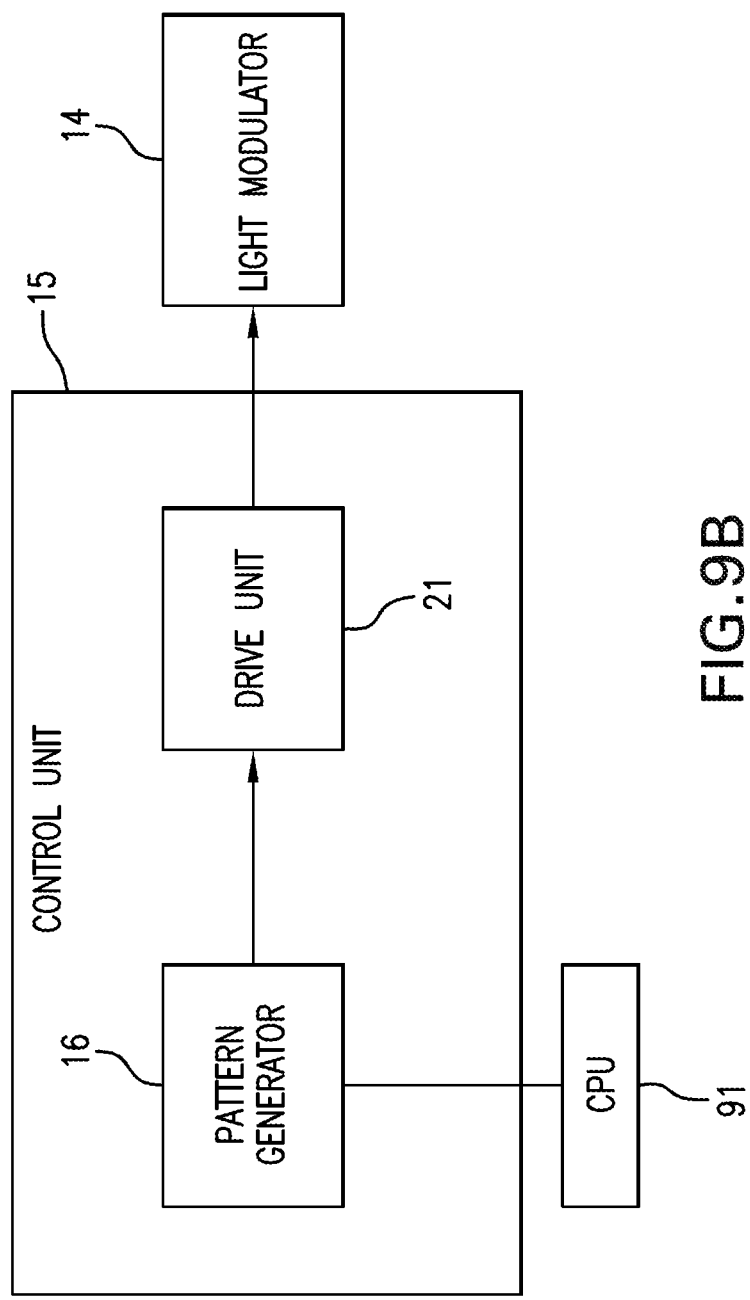

In embodiments of the present invention, the one or more light modulators may 14, 74 be controlled via a control unit 15,15',700, in accordance with the present invention. For example, as shown in FIG. 9A, in an embodiment of the present invention, a control system 1100, in accordance with the present invention, may include a control unit 15,15',700. The control unit 15,15',700 may include a pattern generator 16,16' and/or a drive unit 21,21'. In an embodiment of the present invention, the drive unit 21,21' stores, receives, obtains, and/or formats phase pattern data output by the pattern generator 16,16', and utilizes the phase pattern data to address the pixels and/or write to, for example, the pixels of the light modulator 14,74, such that the phase pattern (e.g., relative phase shift pattern) is induced in the corresponding pixels. In an embodiment of the present invention, as shown in FIG. 9A, the pattern generator 16,16' may be coupled to a processor that is, for example, internal to the control unit 15,15', and may be utilized to generate relative phase shift patterns that are stored by the pattern generator. A control system 1200, in accordance with the present invention, as shown in FIG. 9B, may include, for example, a pattern generator 16,16' coupled to a processor 91 (e.g., a CPU) that is external to the control unit 15,15'. In an embodiment of a control system 1300, in accordance with the present invention, as shown in FIG. 9C, a pattern generator 16,16' and/or processor 91 (e.g., CPU) may be external to the control unit 15,15'.

Figure 10A:
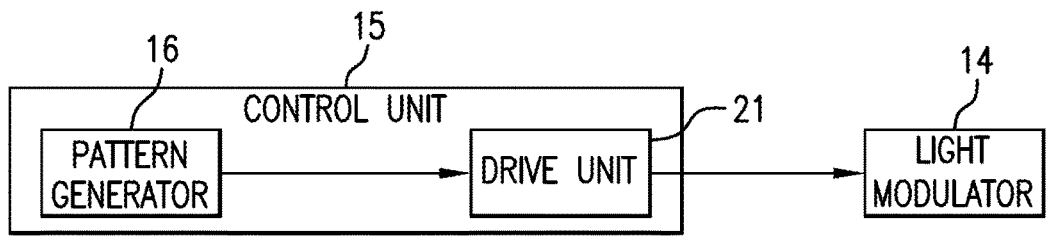
FIGS. 10A-10E illustrate control systems in accordance with the present invention.
Figure 10B:
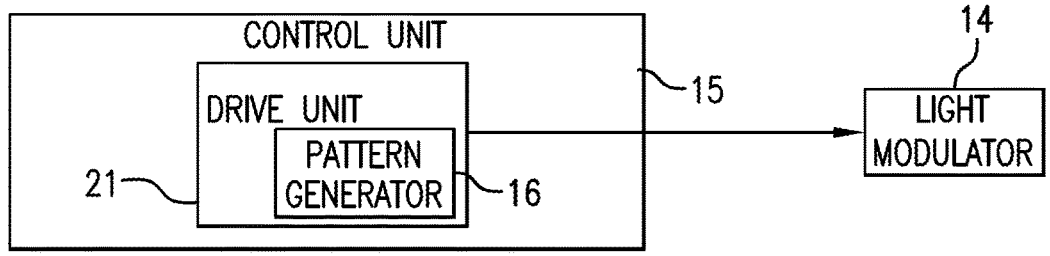
Figure 10C:
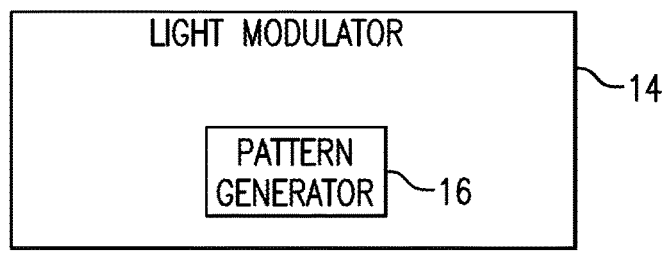
Figure 10D:
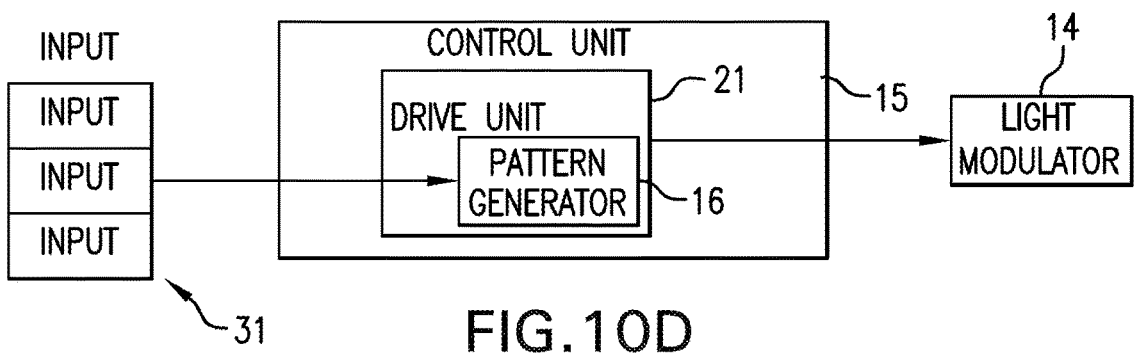
Figure 10E:
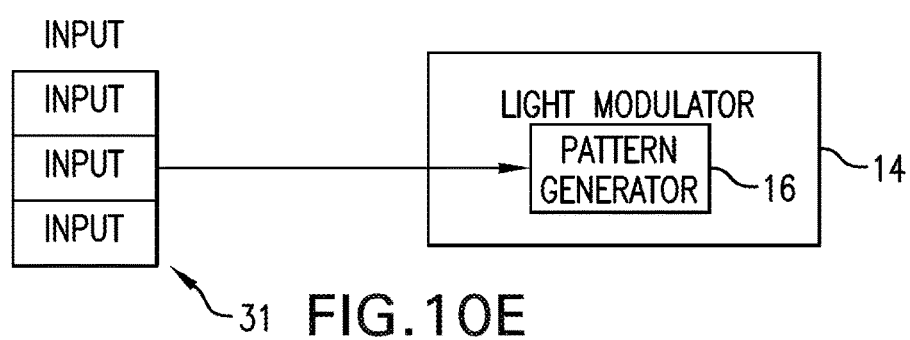
Figure 11:
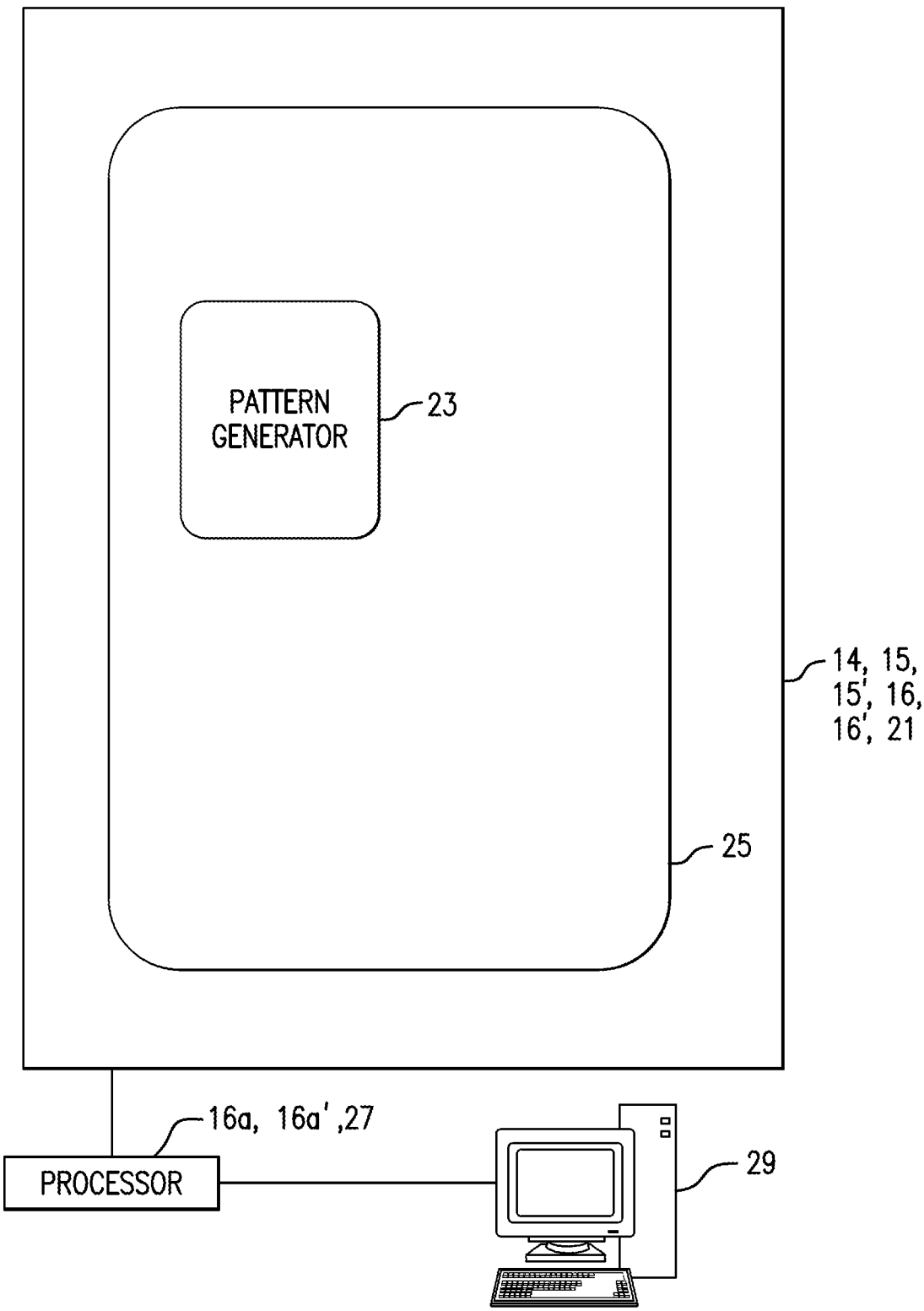
FIG. 11 illustrates systems in accordance with the present invention.

Shown in FIGS. 10A-10E are embodiments of various, but not all, exemplary control systems in accordance with the present invention. Shown in FIG. 10A, is a control system in accordance with the present invention that includes for example a control unit 15,15',700. The control unit 15,15',700 of FIG. 10A includes a pattern generator 16,16' in accordance with the present invention. As shown in FIG. 10A, the pattern generator 16,16' is internal to the control 15,15',700. However, in other embodiments of the present invention, the pattern generator 16 may be external to the control unit 15, 15',700. In an embodiment of the present invention, as shown in FIGS. 10A-10E, the pattern generator 16,16', may be any device and/or software module that outputs video/video data, (e.g., phase patterned video/video data). In an embodiment of the present invention, the pattern generator 16,16' may output one or more relative phase shift pattern and/or a despeckle pattern sequence (e.g., consecutive relative phase shift patterns that are, for example, output and/or refreshed at discrete time intervals). In an embodiment of the present invention, the despeckle pattern and/or despeckle pattern sequence may be one or more video signals, for example, HDMI, MIPI, or other video signals that are transmitted to the drive unit 21,21'. In an embodiment of the present invention, the drive unit 21,21' formats the video signal received to a format that is compatible with the light modulator 14, and, for example, address pixels of the light modulator 14 such that beamlets of light output from the light modulator 14 have a relative phase pattern that corresponds to the relative phase pattern received (e.g., one of the phase patterns of the despeckle pattern sequence). As shown in FIG. 10B, a control system, in accordance with the present invention, may include a control unit/system 15,15',700 that includes a drive unit 21,21'. The drive unit 21,21', in an embodiment of the present invention, may include a pattern generator 16,16'. In an embodiment of a control system, in accordance with the present invention, the pattern generator 16,16' may, for example, generate, access, output, and/or store one or more relative phase shift patterns that are utilized by the drive unit 21,21'. In an embodiment of a control system in accordance with the present invention, as shown in FIG. 10C, the light modulator 14 includes a pattern generator 16 that may store, output, access, and/or generate one or more phase patterns that are utilized by the light modulator 14 to induce one or more relative phase shift patterns in beamlets of light output by the light modulator 14. For example, the pattern generator 16 may be, for example, a memory device internal to the light modulator 14. In another embodiment of the present invention, the pattern generator 16,16' may be external to the light modulator 14 (e.g., is stored in a memory external to the light modulator 14), and accessed, for example, by the light modulator 14. In an embodiment of a control system in accordance with the present invention, as shown in FIG. 10D, the pattern generator 16,16' includes, for example, a computer software module (e.g., pattern generator 23), that is included and/or integrated into the drive unit 21,21', and may, for example, be stored in a memory 25, as shown in FIG. 11, of the drive unit 21,21'. In an embodiment of the present invention, the pattern generator 16,16' may be a random pattern generator that generates random phase patterns. In an embodiment of the present invention, the pattern generator 16,16' may be a configurable pattern generator. For example, in an embodiment of the present invention the pattern generator 16,16' may have one or more inputs 31 (e.g., user inputs) that may be utilized to configure the pattern generator 16,16' to generate, for example, one or more relative phase shift patterns according to a horizontal scaling, a vertical scaling, and/or a pattern mean of corresponding pixels and/or beamlets of light of a light modulator. In an embodiment of the present invention, a pattern generator 16 may be configured, via one or more inputs 31, to have a one or more refresh rates and/or range of refresh rates. In an embodiment of a control system in accordance with the present invention, as shown in FIG. 10E, the pattern generator 16,16' may be a configurable pattern generator 16 that is included in the light modulator 14.

As shown in FIG. 11, in an embodiment of the present invention, the pattern generator 16,16' may include a pattern generator software module 23 (e.g., instructions executable by a processor 16a,16a',27) that is stored in a memory 25, for example, a memory included in or associated with a control unit 15, 15', control system (e.g., control units/systems shown in FIGS. 7B, 9A-9C, 10A-10E, pattern generator 16,16', light modulator 14, and/or drive unit 21,21', in accordance with the present invention. In an embodiment of the present invention, a pattern generator 16,16' may include a pattern generator software module and/or circuitry that is included in the pattern generator 16,16', light modulator 14, and/or drive unit 21. In an embodiment of the present invention, the processor 16a, 16a',27 may be coupled to a computer 29 having at least one input device (e.g., a keyboard, mouse, touchscreen, and/or other input device) and/or a user interface or display, for example, a screen/display associated with computer 29. In an embodiment of the present invention, the pattern generator software module 23 may be pre-programmed to generate one or more relative phase shift patterns or may be programmed by an external device (e.g., an external processor device 16a,16a',27 and/or computer 29), and may be stored on a memory 25 (e.g., a memory internal to and/or external to a drive unit 21,21', a light modulator 14, a control unit/system 15,15', 1100-1300 and/or the pattern generator 16,16' itself). In an embodiment of the present invention, the pattern generator 16,16' may be a memory device 25 having one or more relative phase shift patterns therein that may be accessible to, for example, a processor 16a,16a',27. In an embodiment of the present invention, the pattern generator 16 may comprise hardware circuits and/or electrical components that are configured to output one or more relative phase patterns at one or more instances in time.

As described above, the software module 23 may include logic that is executed by processor 16a,16a',27. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from computer-executable instructions stored on a non-transitory computer-readable medium such as memory or storage 25, including, for example, random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, other commercially available processors and/or or other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future. A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques. System memory may include any of a variety of known or future memory storage devices that can be used to store the desired information and that can be accessed by a computer. Computer readable storage media may include non-transitory volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, and/or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications. Computers or processors may be part of a network. A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet. Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof. It will be apparent those skilled in the art that various modifications and variation can be made in the present invention without departing from the spirit or scope of the invention. Thus, it is intended that the present invention cover the modifications and variations of this invention provided they come within the scope of the appended claims and their equivalents.

Some non-limiting examples of the present invention include:

Example 1 includes an illumination system, comprising: a light modulator that generates beamlets of light; a pattern generator that at least one of generates, outputs and stores at least one relative phase shift pattern utilized by the light modulator, wherein when the relative phase shift pattern is utilized by the light modulator, at least one relative phase shift between at least two adjacent ones of the beamlets of light corresponds to the at least one relative phase shift pattern generated by the pattern generator; a beam shaping device that receives the at least one pair of two adjacent ones of the beamlets of light having the at least one relative phase shift pattern, and superimposes at least part of one of the at least two adjacent ones of the beamlets of light onto at least part of the other of the at least two adjacent ones of the beamlets of light.

Example 2 includes the illumination system of example 1, wherein the at least one relative phase shift pattern comprises a relative phase shift of at least one of zero and pi between the at least two adjacent ones of the beamlets of light at an instance in time.

Example 3 includes an illumination system, comprising: light modulator having pixels that generate beamlets of light; a control unit that addresses the pixels and induces at least one relative phase shift pattern that comprises at least one relative phase shift of at least one of zero and pi between at least one pair of adjacent ones of the beamlets of light output by the light modulator at an instance in time; a beam shaping device that receives the at least one pair of adjacent ones of the beamlets of light having the induced relative phase shift, and superimposes at least part of one of the at least one pair of adjacent ones of the beamlets of light onto at least part of the other of the at least one pair of adjacent ones of the beamlets of light.

Example 4 includes an illumination system, comprising: a light modulator having pixels that generate beamlets of light; a control unit that addresses the pixels and induces at least one relative phase shift pattern that comprises relative phase shifts of at least one of zero and pi between adjacent ones of the beamlets of light output by the light modulator at an instance in time; a beam shaping device that receives the beamlets of light having the induced relative phase shift pattern, and superimposes at least part of one or more of the beamlets of light onto at least part of one or more of the other of the beamlets of light.

Example 5 includes an illumination system of example 4, further comprising a laser light source that generates laser light, and wherein the light modulator receives the laser light from the laser light source.

Example 6 includes the illumination system of example 4, wherein the beam shaping device is at least one of a diffractive optical element, a refractive homogenizer; a light tunnel, and a light pipe.

Example 7 includes the illumination system of example 4, wherein the beam shaping device is a diffractive homogenizer.

Example 8 includes the illumination system of example 4, wherein the beam shaping device is one or more microlens.

Example 9 includes the illumination system of example 4, further comprising a pattern generator that is at least one of coupled to or integrated in the control unit, wherein the pattern generator is a random pattern generator, and wherein the random pattern generator at least one of generates, outputs, and stores at least two relative phase shift patterns, and wherein the at least two relative phase shift patterns vary at different instances in time.

Example 10 includes the relative phase shift pattern of example 4, wherein the relative phase shift between adjacent ones of the beamlets of light is zero at one instance in time and pi at a different instance in time.

Example 11 includes the illumination system of example 4, wherein the at least one relative phase shift pattern is a predefined pattern Example 12 includes the illumination system of example 4, wherein the at least one relative phase shift pattern is a Hadamard pattern.

Example 13 includes the illumination system of example 9, wherein the pattern generator is a configurable pattern generator.

Example 14 includes the illumination system of example 13, wherein the configurable pattern generator is configurable to generate the at least one relative phase shift pattern for pixels groupings.

Example 15 includes the illumination system of example 13, wherein the pattern generator is configured such that the pattern generator generates the at least one relative phase shift pattern for one or more groupings of horizontally aligned pixels.

Example 16 includes the illumination system of example 13, wherein the pattern generator is configured such that the pattern generator generates the at least one relative phase shift pattern for one or more groupings of vertically aligned pixels.

Example 17 includes the illumination system of example 13, wherein the pattern generator receives mean pixel data corresponding to a mean of the pixel values for a grouping of pixels of the light modulator, and wherein mean pixel data is utilized to configure the pattern generator such that the pattern generator outputs the at least one relative phase shift pattern that changes the mean of the pixel values for the grouping of pixels.

Example 18 includes the illumination system of example 13, wherein the pattern generator is a random pattern generator that generates at least two random phase shift patterns, and wherein in the first of the at least two random phase shift patterns is generated at a first instance in time, and wherein a second of the at least two random phase shift patterns is generated at a second consecutive instance in time, and wherein an amount of time between the at least one of generation and output of the first of at least two random phase shift patterns and the at least one of generation and output of the second of the at least two random phase shift patterns is configured according to a refresh rate input to the random pattern generator.

Example 19 includes the illumination system of example 4, further comprising: a drive unit, at least one of coupled to or integrated in the control unit, that at least one of accesses and receives the at least one relative phase shift pattern from the control unit, and wherein the drive unit addresses the pixels of the light modulator, such that the at least one relative phase shift pattern of the beamlets of light output from the light modulator correspond to the at least one relative phase shift pattern at least one of received and accessed by the drive unit.

Example 20 includes the illumination system of example 4, wherein the light modulator is an LCOS device.

Example 21 includes the illumination system of example 4, wherein the light modulator is a phase-only spatial light modulator.

Example 22 includes the illumination system of example 4, wherein the light modulator is a phase-only LCOS spatial light modulator.

Example 23 includes the illumination system of example 4, wherein the control unit at least one of generates, outputs, and stores a first random relative phase shift pattern comprising a relative phase shift of at least one of zero (0) and pi ($\pi$) between the adjacent ones of the beamlets of light at a first instance in time, and wherein the control unit at least one of generates, outputs, and stores a second and different random relative phase shift pattern comprising a relative phase shift of at least one of zero (0) and pi ($\pi$) between the adjacent ones of the beamlets of light at a second instance in time.

Example 24 includes the illumination system of example 4, wherein the control unit at least one of generates, outputs, and stores a first random relative phase shift pattern comprising a relative phase shift of at least one of zero (0) and pi ($\pi$) between the adjacent ones of the beamlets of light at a first instance in time, and wherein the control unit at least one of generates, outputs, and stores a second and different random relative phase shift pattern comprising a relative phase shift of the other of at least one of zero (0) and pi ($\pi$) between the adjacent ones of the beamlets of light at a second instance in time, and wherein the light modulator outputs beamlets of light having speckle at the first instance in time and in the second instance in time, and wherein when the first random relative phase shift pattern at the first instance in time is combined with the second and different random relative phase shift pattern at a second instance in time, the speckle averages to zero or substantially zero.

Example 25 includes the illumination system of example 4, wherein the control unit at least one of generates, outputs, and stores a random phase shift pattern comprising a relative phase shift of some number of radians between and including zero (0) and two pi ($2\pi$) between adjacent ones of the beamlets of light at a first instance in time.

Example 26 includes the illumination system of example 4, wherein the light modulator is positioned at an angle of forty-five degrees with respect to a horizontal plane.

Example 27 includes the illumination system of example 4, wherein a light modulator is positioned perpendicular to a horizontal plane.

Example 28 includes the illumination system of example 5, wherein light from the laser light source is delivered, at least one of directly or indirectly, at an approximate substantially normal to the light modulator.

Example 29 includes the illumination system of example 5, wherein light from the laser light source is delivered, at least one of directly or indirectly, at an approximate angle of forty-five degrees to the light modulator.

Example 30 includes an illumination system, comprising:
a light modulator having pixels that generates beamlets of light;
a control unit coupled to the light modulator that modulates the beamlets of light by addressing the pixels and inducing a temporal phase variation between adjacent pixels at an instance in time such that phase modulated beamlets of light are generated;
a beam shaping device that receives the phase modulated beamlets of light, and superimposes at least part of one or more of the beamlets of light onto at least parts of one or more of the other of the beamlets of light.

Example 31 includes the illumination system of example 30, wherein the beam shaping device superimposes at least part of some of the beamlets of light onto at least parts of other of the beamlets of light at an image plane.

Example 32 includes the illumination system of example 30, wherein the beamlets of light generated by the light modulator have a first shape, and wherein the beam shaping device transforms the beamlets of light into a second and different shape.

Example 33 includes the illumination system of example 30, wherein the beamlets of light generated by the light modulator have a cross section that corresponds to at least one of Gaussian beam and an elliptical beam, and wherein the beam shaping device transforms the beamlets of light into a homogenized pattern of light.

Example 34 includes the illumination system of example 33, wherein the homogenized pattern of light is rectangular.

Example 35 includes the illumination system of example 30, further comprising a laser light source that transmits light to the light modulator; and
a beam conditioning device positioned along a path between the laser light source and the light modulator that at least one of collimates, expands and narrows the light from the laser light source before it reaches the light modulator.

Example 36 includes the illumination system of example 30, further comprising a light director, wherein the light director receives light from a light source and at least one of reflects and transmits light onto the light modulator, and wherein the at least one of reflected and transmitted light is incident on the light modulator substantially perpendicular to the light modulator.

Example 37 includes the illumination system of example 30, further comprising a light director, wherein the light director receives light from the light modulator and at least one of reflects and transmits light onto the beam shaping device, and wherein the at least one of reflected and transmitted light is incident on the beam shaping device substantially perpendicular to the beam shaping device.

Example 38 includes the illumination system of example 37, where the light director is a total internal reflection (TIR) device.

Example 39 includes the illumination system of example 38, wherein the TIR device comprises a pair of prisms.

Example 40 includes a method of illumination, comprising:
receiving light at a light modulator, wherein the light modulator generates beamlets of light;
varying a phase difference between at least some of the adjacent beamlets of light between a first instance of time and a second instance of time and generating phase modulated beamlets; and
diffracting the phase modulated beamlets such that at least portions of light from at least some of the phase modulated beamlets overlap with at least portions of light from some of the other of the phase modulated beamlets.

Example 41 includes the method of illumination of example 40, further comprising varying the phase difference between at least one of zero (0) and pi ($\tau$).

Example 42 includes an apparatus, comprising:
a first light modulator positioned along a light path, wherein the first light modulator generates a first set of beamlets of light; and
a first beam shaping device that generates modified light, wherein the beam shaping device is positioned at least one of before and after the first light modulator in the light path, and wherein when the first beam shaping device is positioned before the first light modulator, the first beam shaping device receives light from a light source, and generates first modified light by diffracting the modified light, at least one of directly or indirectly, onto the light modulator, and wherein the first light modulator generates the first set of beamlets of light after receiving the modified light, and wherein when the first beam shaping device is positioned after the first light modulator, the first light modulator receives light from the light source and generates the first set of beamlets, and wherein the first beam shaping device subsequently generates modified light by diffracting the first set of beamlets of light; and
a second light modulator that receives, directly or indirectly, at least one of the first set of beamlets of light generated when the first beam shaping device is positioned before the first light modulator and the modified light generated when the first beam shaping device is positioned after the first light modulator, and modulates at least one of an amplitude and a phase of the at least one of the first set of beamlets of light and modified light received.

Example 43 includes the apparatus of example 42, wherein the second light modulator modulates the amplitude of the at least one of the first set of beamlets of light and the modified light.

Example 44 includes the apparatus of example 43, wherein the second light modulator generates an image after modulating the amplitude of the at least one of the first set of beamlets of light and the modified light, and said apparatus further comprising:
a projection lens that receives the image.

Example 45 includes a projector, comprising:
a first light source that generates a first beam of light;
a second light source that generates a second beam of light;
a first light modulator that receives the first beam of light and generates a first set of beamlets of light;
a second light modulator that receives the second beam of light and generates a second set of beamlets of light;
a first beam shaping device that receives the first set of beamlets of light, and transforms the first set of beamlets of light such that a first homogenized pattern of light of substantially uniform intensity is generated;
a second beam shaping device that receives the second set of beamlets of light and transforms the second set of beamlets of light such that a second homogenized pattern of light of substantially uniform intensity is generated;
a combining optic device that combines the first homogenized pattern of light and the second homogenized pattern of light and outputs a combined pattern of light; and
a third light modulator that receives the combined pattern of light and generates an image from the combined pattern of light.

Example 46 includes the projector of example 45, wherein the first light modulator and the second light modulator receive light from one or more light sources and modulate only the phase of light received.

Example 47 includes the illumination system of claim 17, wherein the mean pixel data corresponds to at least one of pixel intensity, pixel phase, pixel amplitude, and pixel polarization data.

Example 48 includes the illumination method of claim 40, wherein the phase difference at a discrete instance in time is at least one of zero (0) and pi ($\pi$).

Example 49 includes an illumination system, comprising:
a light modulator having pixels that generate beamlets of light;
a control unit that addresses the pixels and induces at least one relative phase shift pattern that comprises relative phase shifts that vary between zero (0) and 2 pi ($2\pi$) between adjacent ones of the beamlets of light output by the light modulator at an instance in time;
a beam shaping device that receives the beamlets of light having the induced relative phase shift pattern, and superimposes at least part of one or more of the beamlets of light onto at least part of one or more of the other of the beamlets of light.

Example 50 includes an illumination system having an optical path, comprising:
a light modulator that generates beamlets of light;
a pattern generator electrically coupled to the light modulator that at least one of generates, outputs and stores at least one relative phase shift pattern utilized by the light modulator, wherein when the relative phase shift pattern is utilized by the light modulator, at least one relative phase shift between at least two adjacent ones of the beamlets of light corresponds to the at least one relative phase shift pattern generated by the pattern generator;
a light distributor positioned along the optical path such that the light distributor receives the at least two adjacent ones of the beamlets of light corresponding to the at least one relative phase shift pattern, at least one of directly or indirectly, from the light modulator, and superimposes at least part of one of the at least two adjacent ones of the beamlets of light onto at least part of the other of the at least two adjacent ones of the beamlets of light.

Example 51 includes the illumination system of claim 1, wherein the at least one relative phase shift pattern comprises a relative phase shift of at least one of zero and a multiplier of pi, wherein the multiplier is any whole number or fraction of a number, between the at least two adjacent ones of the beamlets of light at an instance in time.

Example 52 includes the illumination system of claim 1, wherein the light distributor is at least one of a diffractive homogenizer, a refractive homogenizer, a reflective homogenizer, and a diffuser.

Example 53 includes the illumination system of claim 1, further comprising a control unit electrically coupled to the light modulator, wherein the pattern generator is at least one of coupled to and integrated into the control unit, and wherein the pattern generator is a random pattern generator, and wherein the random pattern generator at least one of generates, outputs, and stores the at least one relative phase shift pattern.

Example 54 includes the illumination system of claim 1, wherein the at least one relative phase shift pattern is a Hadamard pattern.

Example 55 includes the illumination system of claim 1, wherein the pattern generator is a configurable pattern generator.

Example 56 includes the illumination system of claim 1, wherein the light modulator is an LCOS device.

Example 57 includes the illumination system of claim 1, wherein the light modulator is a phase-only spatial light modulator.

Example 58 includes the illumination system of claim 1, wherein the light modulator is a phase-only LCOS spatial light modulator.

Example 59 includes the illumination system of claim 4, wherein the random pattern generator at least one of generates, outputs, and stores a random phase shift pattern comprising a relative phase shift of a number of radians between and including zero (0) and two pi ($2\pi$) radians.

Example 60 includes the illumination system of claim 1, wherein the light modulator is positioned at an angle of forty-five degrees with respect to a horizontal plane.

Example 61 includes the illumination system of claim 1, wherein a light modulator is positioned perpendicular to a horizontal plane.

Example 62 includes the illumination system of claim 1, further comprising a light source in the optical path, and wherein light from the light source is delivered, at least one of directly or indirectly, at an angle that is substantially normal to the light modulator.

Example 63 includes the illumination system of claim 1, further comprising a light source, and wherein light from the light source is delivered, at least one of directly or indirectly, to the light modulator, and wherein an angle of incidence between the light and the light modulator is between zero and ninety degrees.

Example 64 includes the illumination system of claim 1, wherein the beamlets of light generated by the light modulator form a first shape, and wherein the light distributor transforms the beamlets of light into a second shape that is different from the first shape.

Example 65 includes the illumination system of claim 15, wherein the second shape is rectangular.

Example 66 includes the illumination system of claim 1, further comprising a laser light source that transmits light to the light modulator; and
a beam conditioning device positioned along a path between the laser light source and the light modulator that at least one of collimates, expands and narrows the light from the laser light source before it reaches the light modulator.

Example 67 includes the illumination system of claim 1, further comprising a light director, wherein the light director receives light from a light source and at least one of reflects and transmits light onto the light modulator, and wherein the at least one of reflected and transmitted light is incident on the light modulator substantially perpendicular to the light modulator.

Example 68 includes the illumination system of claim 1, further comprising a light director, wherein the light director receives light from the light modulator and at least one of reflects and transmits light onto the light distributor, and wherein the at least one of reflected and transmitted light is incident on the light distributor substantially perpendicular to the light distributor.

Example 69 includes a method of illumination, comprising:
receiving light at a light modulator, wherein the light modulator generates beamlets of light;
varying a phase difference between at least some of the adjacent beamlets of light between a first instance of time and a second instance of time and generating phase modulated beamlets; and
distributing the phase modulated beamlets such that at least portions of light from at least some of the phase modulated beamlets overlap with at least portions of light from some of the other of the phase modulated beamlets.

Example 70 includes a light modulating system, comprising:
a first light modulator positioned along an optical path, wherein the first light modulator generates a first set of beamlets of light; and
a light distributor that generates modified light, wherein the light distributor is positioned at least one of before and after the first light modulator in the optical path, and wherein when the light distributor is positioned before the first light modulator, the light distributor receives light from a light source, and generates first modified light by distributing the modified light, at least one of directly or indirectly, onto the light modulator, and wherein the first light modulator generates the first set of beamlets of light after receiving the modified light, and wherein when the light distributor is positioned after the first light modulator in the optical path, the first light modulator receives light from the light source and generates the first set of beamlets, and wherein the light distributor, after receiving the first set of beamlets, generates modified light by distributing the first set of beamlets of light; and
a second light modulator that receives, directly or indirectly, at least one of the first set of beamlets of light generated when the light distributor is positioned before the first light modulator, and the modified light generated when the light distributor is positioned after the first light modulator, and wherein the second light modulator modulates at least one of an amplitude and a phase of the at least one of the first set of beamlets of light and the modified light received.

Example 71 includes the light modulating system of claim 21, wherein the second light modulator modulates the amplitude of the at least one of the first set of beamlets of light and the modified light.

Example 72 includes the light modulating system of claim 22, wherein the second light modulator generates an image after modulating the amplitude of the at least one of the first set of beamlets of light and the modified light, and said light modulating system further comprising:
a viewing optic, positioned after the second light modulator in the optical path that receives the image.

Example 73 includes the illumination system of claim 3, wherein the light distributor is a diffractive homogenizer that is a diffractive optical element.

Example 74 includes the illumination system of claim 3, wherein the light distributor is a refractive homogenizer that is a microlens array.

Example 75 includes the illumination system of claim 3, wherein the light distributor is a reflective homogenizer that is at least one of a light tunnel and a light pipe.

What is claimed is:

1. An illumination system, comprising:
   a coherent light source configured to transmit coherent light along an optical path;
   a first light modulator positioned along the optical path, wherein the first light modulator:
     receives light at an angle of incidence of substantially 45 degrees;
     modulates the light based on a relative phase shift pattern; and
     generates beamlets of light for subsequent use in forming an image having reduced speckle,
     the first light modulator being a reflective and non-image forming light modulator;
   a pattern generator electrically coupled to the first light modulator, the pattern generator configured to generate the relative phase shift pattern utilized by the first light modulator, wherein when the relative phase shift pattern is utilized by the first light modulator to reduce speckle of an image subsequently formed using the beamlets of light, at least one relative phase shift between at least two of the beamlets of light corresponds to the relative phase shift pattern;
   a light distributor that generates modified light having at least one of a different pattern or a different shape, wherein the light distributor is positioned before or after the first light modulator in the optical path; and a second light modulator positioned after the first light modulator and the light distributor in the optical path at substantially a 45 degree angle to the first light modulator, wherein the second light modulator modulates at least one of an amplitude and a phase of light, the second light modulator being a reflective and image forming light modulator.

2. The illumination system of claim 1, wherein the relative phase shift pattern comprises a relative phase shift of at least one of zero and a multiplier of pi, wherein the multiplier is any whole number or fraction of a number, between the at least two beamlets of light at an instance in time.

3. The illumination system of claim 1, wherein the light distributor is at least one of a diffractive homogenizer, a refractive homogenizer, a reflective homogenizer, and a diffuser.

4. The illumination system of claim 1, further comprising a control unit electrically coupled to the first light modulator, wherein the pattern generator is at least one of coupled to and integrated into the control unit, and wherein the pattern generator is a random pattern generator, and wherein the random pattern generator at least one of generates, outputs, and stores the relative phase shift pattern.

5. The illumination system of claim 1, wherein the relative phase shift pattern is a Hadamard pattern.

6. The illumination system of claim 1, wherein the pattern generator is a configurable pattern generator.

7. The illumination system of claim 1, wherein the first light modulator is an LCOS device.

8. The illumination system of claim 1, wherein the first light modulator is a phase-only spatial light modulator.

9. The illumination system of claim 1, wherein the first light modulator is a phase-only LCOS spatial light modulator.

10. The illumination system of claim 1, wherein:
the beamlets of light generated by the first light modulator form a first shape, and
the light distributor:
is positioned after the first light modulator in the optical path; and
transforms the beamlets of light into a second shape that is different from the first shape.

11. The illumination system of claim 10, wherein the second shape is rectangular.

12. The illumination system of claim 1, wherein:
the coherent light source comprises a laser light source; and
the illumination system further comprises a beam conditioning device positioned along the optical path between the laser light source and the first light modulator that at least one of collimates, expands and narrows light before it reaches the first light modulator.

13. The illumination system of claim 1, further comprising a light director, wherein the light director at least one of reflects and transmits light onto the first light modulator.

14. The illumination system of claim 1, wherein:
the second light modulator generates an image after modulating the amplitude of the light; and
the illumination system further comprises:
a viewing optic, positioned after the second light modulator in the optical path, that receives the image.

15. The illumination system of claim 1, wherein the light distributor is a diffractive homogenizer that is a diffractive optical element.

16. The illumination system of claim 1, wherein the light distributor is a refractive homogenizer that is a microlens array.

17. The illumination system of claim 1, wherein the light distributor is a reflective homogenizer that is at least one of a light tunnel and a light pipe.

18. The illumination system of claim 1, wherein the second light modulator is a liquid crystal device.

19. An illumination system, comprising:
a coherent light source configured to transmit coherent light along an optical path;
a light distributor that generates modified light having at least one of a different pattern or a different shape, wherein:
the light distributor receives the coherent light, and generates first modified coherent light by distributing the received coherent light;
a first light modulator positioned along the optical path, wherein the first light modulator:
receives, at an angle of incidence of substantially 45 degrees, the first modified coherent light, at least one of directly or indirectly;
modulates the first modified coherent light based on a relative phase shift pattern, thereby generating beamlets of light for subsequent use in forming an image having reduced speckle,
the first light modulator being a reflective and non-image forming light modulator;
a pattern generator electrically coupled to the first light modulator, the pattern generator configured to generate the relative phase shift pattern utilized by the first light modulator, wherein when the relative phase shift pattern is utilized by the first light modulator to reduce speckle of an image subsequently formed using the beamlets of light, at least one relative phase shift between at least two of the beamlets of light corresponds to the relative phase shift pattern;
a second light modulator positioned after the first light modulator in the optical path at substantially a 45 degree angle to the first light modulator, wherein the second light modulator:
receives, directly or indirectly, the beamlets of light; and
modulates at least one of an amplitude and a phase of the beamlets of light,
the second light modulator being a reflective and image forming light modulator.

20. A method for reducing speckle in a projected image, comprising:
receiving, at a reflective and non-image forming first light modulator, at an angle of incidence of substantially 45 degrees, coherent light;
generating, at the first light modulator, corresponding beamlets of light, wherein at least one relative phase shift between at least two of the beamlets of light varies over time in a random or pseudo random manner;
shaping the beamlets of light into at least one of different pattern and a different shape, such that at least part of one of the at least two beamlets of light is superimposed onto at least part of another of the at least two beamlets of light, thereby generating modified light;
receiving the modified light, directly or indirectly, at a reflective and image forming second light modulator positioned at substantially a 45 degree angle to the first light modulator; and modulating at least one of an amplitude and a phase of the modified light, using the second light modulator, to form an image.

\* \* \* \* \*